(12) United States Patent
Rocha

(10) Patent No.: US 11,701,812 B2
(45) Date of Patent: Jul. 18, 2023

(54) TOUCH FASTENERS AND METHODS OF FORMATION

(71) Applicant: Gerald Rocha, Bedford, NH (US)

(72) Inventor: Gerald Rocha, Bedford, NH (US)

(73) Assignee: Soni-Form, LLC., Derry, NH (US)

( * ) Notice: Subject to any disclaimer, the term of this patent is extended or adjusted under 35 U.S.C. 154(b) by 49 days.

(21) Appl. No.: 17/203,932

(22) Filed: Mar. 17, 2021

(65) Prior Publication Data

US 2021/0362398 A1 Nov. 25, 2021

Related U.S. Application Data

(63) Continuation of application No. 15/873,365, filed on Jan. 17, 2018, now Pat. No. 10,981,321, which is a
(Continued)

(51) Int. Cl.
*B29C 59/04* (2006.01)
*B29C 43/46* (2006.01)
(Continued)

(52) U.S. Cl.
CPC ........ *B29C 59/046* (2013.01); *A44B 18/0049* (2013.01); *B29C 35/0261* (2013.01);
(Continued)

(58) Field of Classification Search
CPC ........ B29C 35/0261; B29C 2043/3266; B29C 2043/3636; B29C 2043/5092;
(Continued)

(56) References Cited

U.S. PATENT DOCUMENTS

| 3,390,218 A | 6/1968 | Painter et al. |
| 3,556,921 A | 1/1971 | Painter et al. |

(Continued)

FOREIGN PATENT DOCUMENTS

| DE | 101 02 501 A1 | 1/2002 |
| JP | H09-195154 A | 7/1997 |

(Continued)

OTHER PUBLICATIONS

International Search Report and Written Opinion for International Application No. PCT/US2016/022420, dated Sep. 6, 2016.
(Continued)

*Primary Examiner* — Jeffrey M Wollschlager
(74) *Attorney, Agent, or Firm* — Wolf, Greenfield & Sacks, P.C.

(57) ABSTRACT

Aspects disclosed herein relate to forming on a substrate fastener elements suitable for use in touch fastener by employing vibration forming methods. The processes described provide for a greater flexibility in manufacturing than prior methods and overcome certain limitations in prior forming techniques. Further, the product made can embody a variety of different configurations suitable for a given application. Employing vibration forming methods, such as ultrasonic forming methods, allows for the use of a wider variety of substrate material than materials used with convention methods of touch fastener formation.

5 Claims, 19 Drawing Sheets

Related U.S. Application Data continuation of application No. 15/558,575, filed as application No. PCT/US2016/022420 on Mar. 15, 2016, now Pat. No. 10,953,592.

(60) Provisional application No. 62/133,577, filed on Mar. 16, 2015.

(51) Int. Cl.
| | |
|---|---|
| *B29C 59/02* | (2006.01) |
| *B29C 35/02* | (2006.01) |
| *B29C 53/04* | (2006.01) |
| *B29C 53/24* | (2006.01) |
| *A44B 18/00* | (2006.01) |
| *B29L 31/00* | (2006.01) |
| *B29C 48/00* | (2019.01) |
| *B29C 53/02* | (2006.01) |
| *B29C 53/22* | (2006.01) |
| *B29C 43/22* | (2006.01) |

(52) U.S. Cl.
CPC ............ *B29C 43/46* (2013.01); *B29C 53/04* (2013.01); *B29C 53/24* (2013.01); *B29C 59/025* (2013.01); *B29C 59/04* (2013.01); *A44B 18/0061* (2013.01); *B29C 43/222* (2013.01); *B29C 48/0019* (2019.02); *B29C 53/02* (2013.01); *B29C 53/22* (2013.01); *B29C 2043/463* (2013.01); *B29C 2791/008* (2013.01); *B29L 2031/729* (2013.01); *B29L 2031/7276* (2013.01)

(58) Field of Classification Search
CPC .......... B29C 45/568; B29C 65/08–088; B29C 2791/008; B29C 59/046; B29C 43/46; B29C 53/04; B29C 53/24; B29C 59/025; B29C 59/04; B29C 43/222; B29C 48/0019; B29C 53/02; B29C 53/22; B29C 2043/463; A44B 18/0049; A44B 18/0061; B29L 2031/7276; B29L 2031/729
See application file for complete search history.

(56) References Cited

U.S. PATENT DOCUMENTS

| | | | |
|---|---|---|---|
| 3,765,193 A * | 10/1973 | Conroux | ................. D04B 9/12 26/9 |
| 4,633,565 A | 1/1987 | DeWoskin | |
| 5,586,371 A * | 12/1996 | Thomas | ............... A61F 13/625 24/448 |
| 5,624,427 A | 4/1997 | Bergman et al. | |
| 5,786,061 A | 7/1998 | Banfield | |
| 5,888,621 A | 3/1999 | Fröhlich et al. | |
| 6,080,347 A | 6/2000 | Goulait | |
| 6,565,943 B1 * | 5/2003 | Kondo | ............... A44B 18/0038 24/444 |
| 6,544,245 B2 | 8/2003 | Neeb et al. | |
| 6,645,330 B2 | 11/2003 | Pargass et al. | |
| 7,162,780 B2 | 1/2007 | Martin et al. | |
| 7,223,314 B2 | 5/2007 | Provost | |
| 7,172,008 B2 | 6/2007 | Vanbenschoten et al. | |
| 8,784,722 B2 | 7/2014 | Rocha | |
| 9,119,443 B2 | 9/2015 | Barker et al. | |
| 10,076,162 B2 | 9/2018 | Rocha | |
| 10,953,592 B2 | 3/2021 | Rocha | |
| 10,981,321 B2 | 4/2021 | Rocha | |
| 2002/0023321 A1 | 2/2002 | Clune | |
| 2003/0120253 A1 * | 6/2003 | Wentzel | .................. A61F 13/64 604/391 |
| 2004/0222551 A1 | 11/2004 | Provost et al. | |
| 2005/0132543 A1 | 6/2005 | Lindsay et al. | |
| 2005/0161851 A1 | 7/2005 | Tachauer et al. | |
| 2005/0101930 A1 | 12/2005 | Tachauer et al. | |
| 2005/0280175 A1 | 12/2005 | Tachauer et al. | |
| 2006/0101626 A1 | 5/2006 | Gallant et al. | |
| 2006/0226571 A1 | 10/2006 | Clune | |
| 2008/0082076 A1 * | 4/2008 | Kingsford | ............. A61F 13/627 604/391 |
| 2010/0004616 A1 * | 1/2010 | Nakamura | ........ A61F 13/15756 604/389 |
| 2010/0087794 A1 * | 4/2010 | Labit | ..................... A61F 13/505 604/385.15 |
| 2010/0180407 A1 | 7/2010 | Rocha | |
| 2014/0130311 A1 | 5/2014 | Okuda et al. | |
| 2014/0264996 A1 | 9/2014 | Rocha | |
| 2017/0265602 A1 | 9/2017 | Rocha | |
| 2018/0050484 A1 | 2/2018 | Rocha | |
| 2018/0141266 A1 | 5/2018 | Rocha | |

FOREIGN PATENT DOCUMENTS

| | | |
|---|---|---|
| JP | 2004-081254 A | 3/2004 |
| JP | 2013-070854 A | 4/2013 |
| JP | 2015-043808 A | 3/2015 |
| JP | 2016-528951 A | 9/2016 |
| TW | 201217594 A | 5/2012 |
| TW | 201343099 A | 11/2013 |
| WO | WO 2013/005297 A1 | 1/2013 |

OTHER PUBLICATIONS

International Preliminary Report on Patentability for International Application No. PCT/US2016/022420, dated Sep. 28, 2017.

* cited by examiner

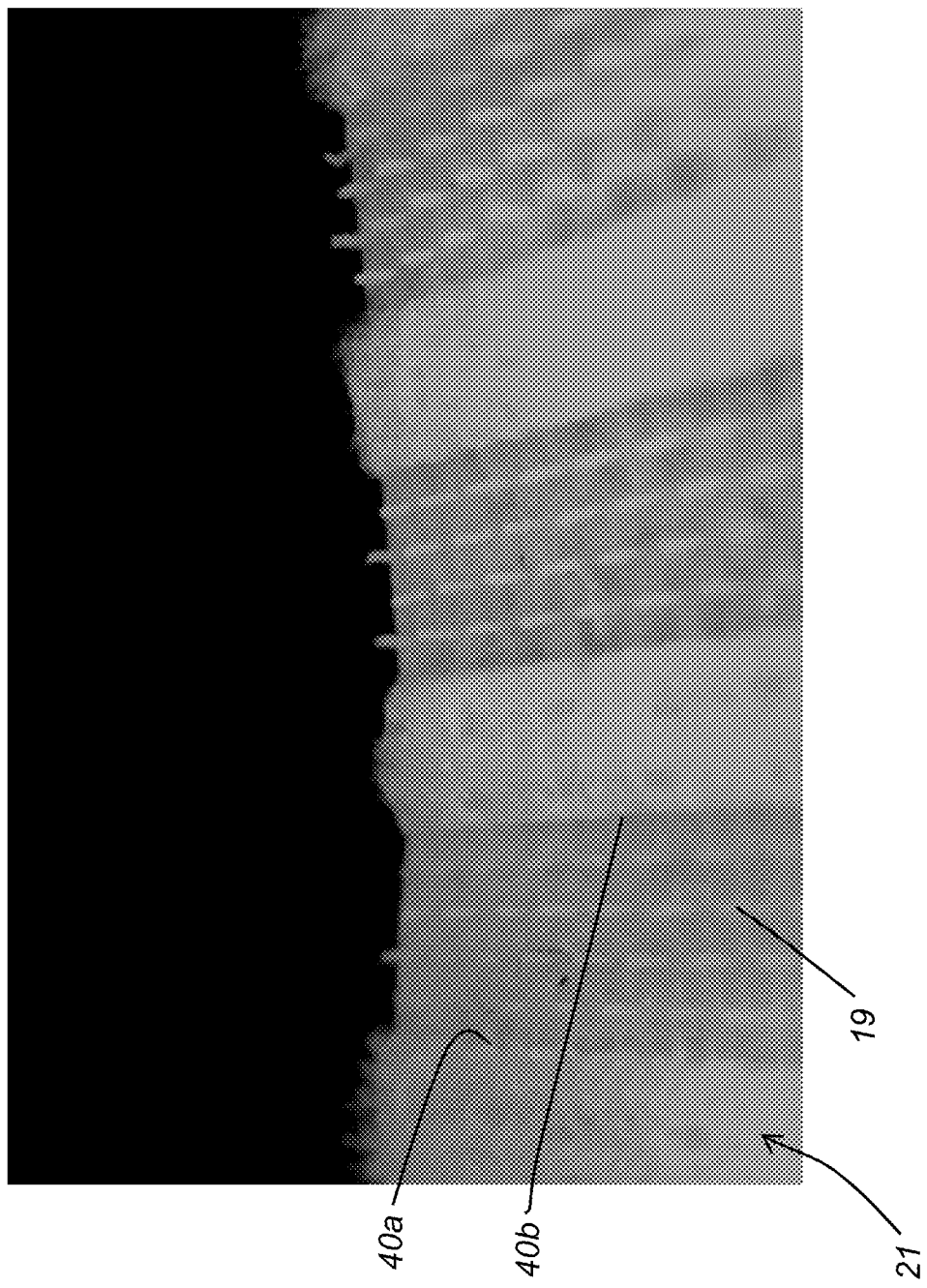

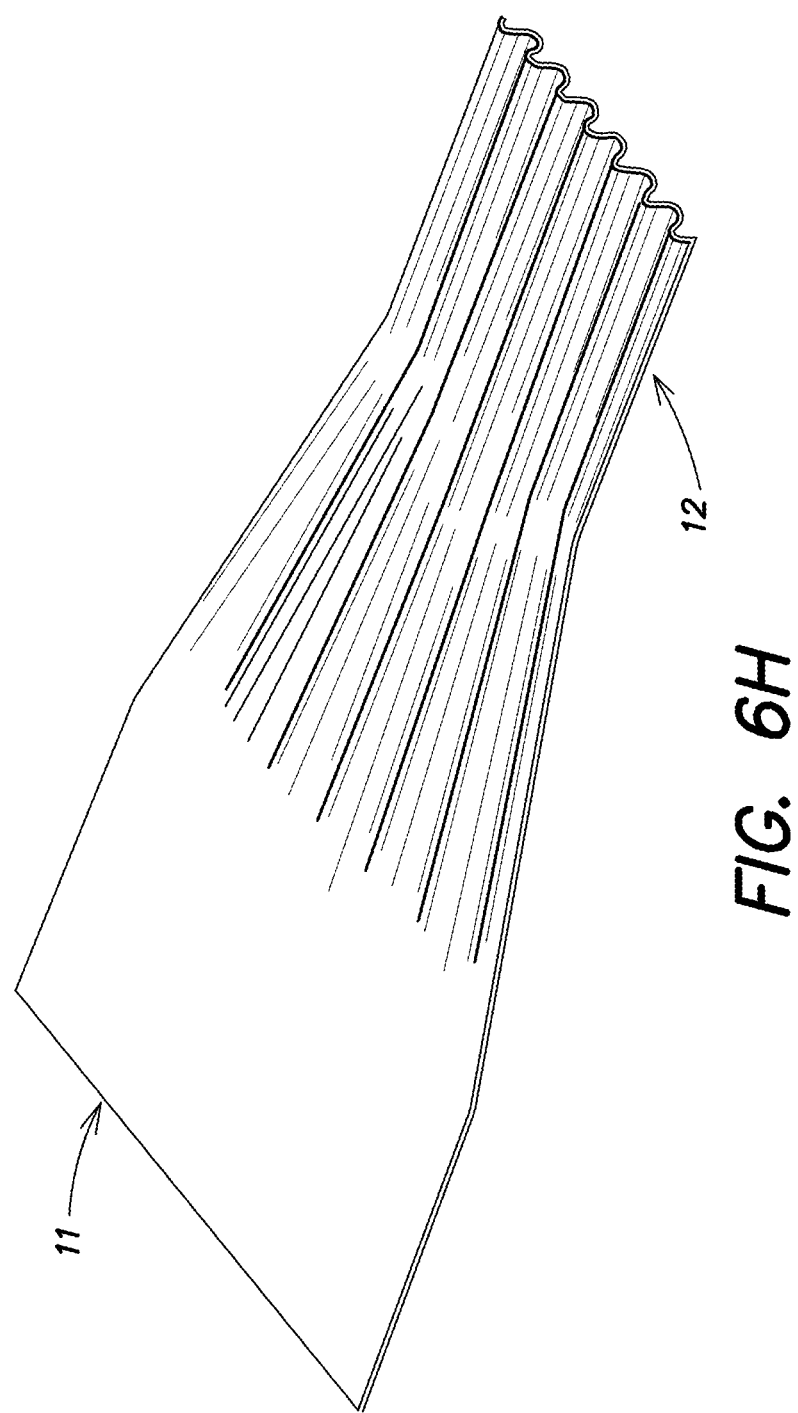

TOUCH FASTENERS AND METHODS OF FORMATION

CROSS-REFERENCE TO RELATED APPLICATIONS

This application is a continuation of U.S. application Ser. No. 15/873,365, filed Jan. 17, 2018, which is a continuation of U.S. application Ser. No. 15/558,575, filed Sep. 15, 2017, which is a national stage filing under 35 U.S.C. § 371 of international application PCT/US2016/022420, filed Mar. 15, 2016, which claims the benefit under 35 U.S.C. § 119(e) of U.S. provisional application Ser. No. 62/133,577, filed Mar. 16, 2015, each of which is incorporated by reference herein in its entirety.

FIELD

Disclosed embodiments are related to touch fasteners and methods of forming a touch fastener.

BACKGROUND

Touch fasteners such as Velcro®, Scotchmate®, and Tri-Hook® were originally produced using textile technology. Two common types of touch fasteners include hook and loop fasteners as well as mushroom and loop fasteners. Hook and loop type fasteners, as they were originally developed and commercialized, consisted of a textile strip including numerous monofilament fastener elements, shaped like hooks, projecting from one surface and another mating textile strip including multifilamented fastener elements woven into loop shaped projections on the opposing mating surface. In the case of mushroom and loop fasteners, the fastener includes a strip containing numerous monofilament projections with mushroom shaped heads.

Thermoplastic extrusion and molding methods for making touch fasteners have been employed. In the case of hook and loop fasteners, a hook strip may be extruded or molded in a number of different ways. With regards to mushroom and loop fasteners, the mushroom strip may be produced by extruding or molding a strip of material having pin-like projections and subsequently forming mushroom-like heads on the pin-like projections, typically by heating the tips of the projections until a mushroom head is formed on each projection. A mating portion of the touch fastener is typically a loop strip produced using woven, knitted, and/or non-woven technologies.

Applicant's U.S. Pat. No. 8,784,722, which is hereby incorporated herein by reference in its entirety, describes forming projections on a substrate suitable for use in a touch fastener using ultrasonic formation methods.

SUMMARY

According to one aspect, a method of forming a touch fastener is disclosed. The method includes gathering substrate material from a first area of a substrate to a second smaller area of the substrate to increase an amount of the material in the second area relative to the first area and forming fastening elements in the second area. The fastening elements are engageable with a loops or a loop-like structures.

According to another aspect, a touch fastener mold is provided. The mold includes a plurality of contact regions constructed and arranged to contact a substrate during a formation process. A plurality of recesses surrounds the plurality of contact regions. A plurality of cavities is formed in the plurality of contact regions. The plurality of cavities are shaped to form touch fasteners.

According to yet another aspect, a method of ultrasonically forming a touch fastener is disclosed. The method includes positioning a substrate adjacent a mold and applying energy to the substrate using a plurality of contact areas of the mold to soften at least a portion of the substrate. The softened substrate material is forced into one or more cavities formed in the plurality of contact regions to form a plurality of fastener elements.

According to still another aspect, a method of ultrasonically forming a touch fastener is disclosed. The method includes heating the substrate from a first temperature to a second temperature below a melting point of the substrate and thereafter ultrasonically forming fastening elements on the substrate.

According to yet another aspect, a method of forming a touch fastener is disclosed. The method includes positioning a substrate adjacent a vibration source and forcing a portion of the substrate into mold cavities upon vibration from the vibration source to produce a plurality of fastening elements. A plurality of spaced-apart fields having a plurality of leading and trailing edges is formed on a surface of the substrate. The plurality of fields include a plurality of fastening elements.

According to another aspect, a touch fastener is provided. The touch fastener includes a substrate including a substrate surface, with the substrate including an elastomeric material. A recess is formed in the substrate and extending inward from the substrate surface. One or more fastening elements extends from within the recess towards the substrate surface. A height of the plurality of fastening elements is less than or equal to a height of the recess when the substrate is relaxed.

According to yet another aspect, a method of forming a touch fastener is disclosed. The method includes stretching a substrate, with the substrate includes an elastomeric material, positioning the substrate adjacent a vibration source, forcing a portion of the substrate into mold cavities upon vibration from the vibration source, and forming a plurality of fastening elements on the stretched substrate.

According to still another aspect, a method of forming a touch fastener is disclosed. The method includes positioning a substrate adjacent a vibration source, forcing a first portion of the substrate into first mold cavities upon vibration from the vibration source to produce fastening elements, and forcing a second portion of the substrate into second mold cavities upon vibration from the vibration source to produce reinforcing elements adjacent to the fastening elements.

According to another aspect, a method of forming a touch fastener is disclosed. The method includes positioning a substrate having loop structures disposed thereon adjacent a vibration source and forcing a first portion of the substrate into first mold cavities upon vibration from the vibration source to produce fastening elements.

According to still another aspect, a method of forming a touch fastener is disclosed. The method includes positioning a substrate adjacent a vibration source, forcing a first portion of the substrate into first mold cavities upon vibration from the vibration source to produce fastening elements, and applying an additive material during or prior to the vibration from the vibration source. The additive becomes at least partially encapsulated in the fastening elements.

According to still another aspect, a method of forming a touch fastener is disclosed. The method includes positioning a substrate adjacent a vibration source, positioning a layer of material adjacent the substrate, forcing a first portion of the substrate into first mold cavities upon vibration from the vibration source to produce fastening elements so that the material of the substrate extends through the layer of material.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 2A-2D depict various embodiments of fastening elements formed on substrates;

FIG. 6H shows a schematic representation of a gathered substrate in accordance with one embodiment;

DETAILED DESCRIPTION

Figure 1A:
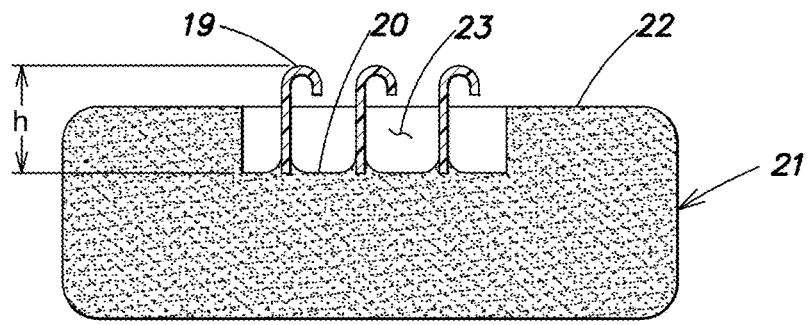
FIGS. 1A-1D show various configurations of fastening elements and a substrate in accordance with some embodiments.

Aspects disclosed herein relate to forming on a substrate fastener elements suitable for use in touch fastener. The processes described provide for a greater flexibility in manufacturing than prior methods and overcome certain limitations in prior forming techniques. Further, the product made can embody a variety of different configurations suitable for a given application.

In one aspect, employing vibrational forming methods (for example, ultrasonic forming methods) allows for the use of a wider variety of substrate material than materials used with convention methods of touch fastener formation. For example, the inventor has recognized that ultrasonic energy may be applied to previously formed substrates such that at least portions of the substrate may be formed with the desired fastener element. Forming fastener elements such as hook elements, or other projections suitable for use in a touch fastener, directly onto a portion of a pre-formed substrate may permit the completed product to retain the benefits of the material chosen for the substrate. In this regard, though not limited in this respect, the need to subsequently attach a separately formed touch fastener to an otherwise completed product (e.g., diaper) is avoided and the resulting product is able to retain its properties. For example, fastener elements may be formed onto a preformed elastomeric nonwoven substrate. The use of elastomeric substrate permits the mated closure to be flexible. In application on an infant diaper, this flexibility may be desirable because it can minimize irritation to the infant often caused by conventional, overly rigid touch fasteners (e.g., such as might be the case where a separately formed touch fastener component is subsequently attached to the diaper). Further, though not limited in this respect, forming the fastener element directly on to the product may result in reduced inventory, reduced post-processing (e.g., where the touch fastener must be subsequently applied to the product), increased production speed, and lower manufacturing cost.

Accordingly, in addition to conventional materials/configurations, other substrate materials and/or configurations may now be employed, such as woven or non-woven substrates; knitted substrates; foam substrates; substrates incorporating biodegradable components; substrates formed of or otherwise containing cellulosic material; substrates formed into screens or meshes; fabric substrates; film, sheet or web substrates; composite substrates containing one or more materials and/or configurations; laminate substrates (whether pre-formed or laminated during the vibrational formation process); substrates incorporating loops configured to mate with corresponding fastener elements; substrates containing other property modifying components, such as substrates with metallic wires or foils; reinforced substrates; substrates formed of or containing elastic or elastomeric materials; and substrates containing inextensible components. It should be appreciated that other materials may be included in the preformed substrate or introduced during the forming process. Such other materials and/or components include, but are not limited to, films, foams, wovens, nonwovens, metals, polymers, monofilaments, wire, static discharge materials, papers, fibers, adhesives (e.g., liquid, hot melt, or pressure sensitive adhesives), and powders. Such materials and/or components may be used to enhance the properties (e.g., strength, dielectric, temperature, etc.) of the substrate and/or formed fastener elements. Thus, a substrate may be any appropriate material or component for supporting fastener elements and/or providing material for forming fastener elements.

According to another aspect, the use of vibration energy such as ultrasonic energy to form fastener elements allows for the application of certain desired patterns. In this regard, in addition to embodiments where the fastener elements are formed across the entire surface of the substrate, a single or multiple fastener elements may be formed at desired locations, for example in a checkerboard pattern, in rows or stripes, in circular, oval, annular, polygonal (square or rectangular) shapes or even in the pattern of a logo. In one embodiment, multiple fastener elements are formed on a patch of the substrate and multiple patches of the formed substrate (formed with the multiple fastener elements) are arranged in a desired pattern such as a checkerboard pattern of alternating formed and unformed patches. Other patterns may be employed, as aspects are not limited in this respect. Some of the fastener elements may be differently shaped than other fastener elements. Fastener elements may be formed on each surface of the substrate. Such patterning can provide some useful benefits. For example, the inventor has appreciated that there tends to be enhanced attachment along the leading and trailing edges of a field of fastener elements with its mating component. Accordingly, by forming the substrate with a plurality of fastener fields, there can be more leading and trailing edges of fastener elements (e.g., hooks) available for engagement with the mating component of a touch fastener (e.g., loops). The field may be aligned in an arc or at an angle relative to an edge of the substrate or in any other pattern as desired. The field may be formed such that it is spaced inward of the peripheral edge of the substrate providing a buffer zone at the edge, thereby reducing the stiffness of the edge. This may be particularly useful when forming the fastener elements on a diaper such as the material forming the diaper tab. The unaltered edge of the tab (that is, due to the inward formation of the fastener field) may aid in reducing irritation of the diaper tab against a baby's skin. It should be appreciated that the diaper tab may be a separate component that is subsequently attached to other portions of a diaper or the diaper tab may be an extension of a portion of the diaper, such as an extension of a side panel of the diaper. Thus, as used herein, the terms "diaper tab", "diaper side tab", "side tab" and "side panel" are used interchangeably to mean these alternative arrangements, unless specifically stated otherwise.

Further, spacing fields of fastener elements apart from each other can render the component to be self-engaging where the substrate itself is suitable to mate with the fastener elements. In one embodiment, one or more fields of hook fasteners may be vibrationally (e.g., ultrasonically) formed onto a preformed loop substrate, with the fastener being formed from the loop material itself. Once the hooks are formed onto the loop substrate, the substrate can be folded or layered onto itself such that the field of hooks engages with the adjacent loops. This is possible because the vibrational formation process allows for the formation of hooks onto a substrate that has been preformed as convention loop material. It should be appreciated that the hooks can be formed intermittently or in spaced apart fields of hooks such that spaced apart fields of loop material remains. Alternatively one entire area of the substrate may be formed into hooks that can then engage the adjacent loop material of the virgin or unaltered loop substrate. Further, it should be appreciated that the loop structure of the substrate may be on one surface of the substrate whereas the hook is formed on the opposite surface. This opposite surface may or may not have a loop structure. Also, the opposite surface may or may not be formed with hooks. In one or more of these embodiments, a first portion of the substrate containing the loop material is forced into mold cavities to produce fastening elements. That is, the loop material or loop structure itself is forced into mold cavities to form fastening elements on the otherwise loop substrate. Examples of a resulting product include diaper tabs, cable ties or wraps. Furthermore, the substrate material may be modified and/or enhanced so as to render the substrate more suitable to engage with the fasteners. For example, as will be explained in more detail below, the substrate material that is not vibrationally formed into fastener elements may be embossed using ultrasonic energy by depressing regions of the substrate. The embossing may cause the non-depressed regions to exhibit greater potential for engagement with the fasteners, by for example, standing proud of the depressed regions and thus more readily able to engage with the fasteners. For example, a non-woven substrate material having random fibers can be embossed such that at least some of the ends of the fibers are "welded" (i.e., "staked") down by the embossment to create at least some loops with which to engage fastener elements.

Vibrationally forming fastener elements on substrates may further provide enhanced performance of the fastener elements and/or the finished component. According to another aspect, the substrate may include one or more desired features. For example, the substrate may include or be formed with reinforcement features, such as ribs, bumps, creases or other structural configurations to selectively stiffen or reinforce the substrate or select areas thereof. Such reinforcement features may be formed adjacent to the fastener field or as part of the fastener element or elements to provide support to the fasteners.

An elastomeric substrate may be stretched prior to the vibrational formation of the fastener elements. For example, the elastomeric substrate is stretched and then fastener elements are ultrasonically formed on the stretched substrate. Upon relaxing the substrate thereafter, the fastener elements are nestled closer together, resulting in a smoother tactile feel. For example, the top surfaces of the hooks, being closely spaced, allows the hooks to ride or glide over a person's skin such that the person is unable to feel (or feel only slightly) the terminal end of the hook, which might otherwise cause a pinching or scratching sensation. Upon stretching the substrate to engage a mating material or component, the field of fastener elements bloom, allowing the individual fastener elements to be able to engage with the mating component. Further, another benefit of employing an elastomeric substrate is that once the fastener elements are engaged, the relaxing of the substrate tends to cause the fastener elements to rake across the mating surface, thereby enhancing engagement. In addition or alternatively, the fastener elements may be formed in spaced apart fields on the stretched elastomeric substrate. When the substrate is thereafter in a relaxed state, the unaltered regions between the fastener fields tend to loft. This lofting may approach the height of the fastener elements and server to shield the fastener element from premature engagement. The lofted substrate may further improve the tactile feel of the product, reducing the perceived abrasiveness of the fastener elements. This too can be beneficial in applications such as on diapers (e.g., diaper tabs) where the fastener elements may otherwise cause an irritation on the baby's skin.

It may be desirable to limit the amount of stretching of the substrate. Thus, the substrate may include or may be formed to include a tether that is joined to the substrate to limit the amount of extension upon stretching. Thus, a non-extensible strip or film of polymeric or other material may be incorporated into the substrate upon ultrasonic formation of the fastener elements. Other suitable arrangements for limiting the stretch may be employed, as the present disclosure is not limited in this regard. For example, and as will be explained more fully below, the substrate may be formed with berms which may be placed in a zig-zag pattern. The berm may extend from the base of one fastener element to an adjacent fastener element.

In one aspect, the inventor found that employing ultrasonics in the way described below can improve throughput of the formation process as compared to the process described in applicant's above-referenced patent. The inventor discovered that the maximum line speed of production may be limited by the available power of the ultrasonic generator. In one embodiment, the throughput can be improved by minimizing the amount of substrate material that is heated by the ultrasonic generator. For example, the mold tool and/or surface of the ultrasonic tool that imparts energy to the substrate may be configured with a topology that concentrates the energy to where it is most needed. In one embodiment, forming such a surface may include forming the surface with spaced apart recesses surrounding the cavities which form the fastener elements. In this way, the energy from the ultrasonic generator is concentrated around the mold cavity where it is necessary so that the substrate material can enter the cavity. There is no need to apply energy to the area away from the mold cavity if the substrate material at that location is not needed for forming the projections. Such topography of the relevant surface(s) may also be configured to take into account any desired reinforcement to the substrate (e.g., reinforcement rib) and/or resulting fastener element.

According to another aspect, line speed may be increased by preheating the substrate prior to the application of the vibration energy. The temperature of the substrate would be raised to below its melting point and the ultrasonic energy need only be sufficient to increase the temperature an additional amount (less than would be required without preheating) to allow the material to enter the mold cavities. Preheating the substrate can be performed in any number of ways, including but not limited to, using a heater immediately prior to the substrate being acted on by the vibrational energy source, bulk heating the substrate either in a separate oven or by employing a heated feed roller or feed chamber, etc. The heat may be convection (such as a hot air blower), radiant (such as heat lamps or filaments) or RF (radio frequency).

The inventor has found that it may be desirable to enhance the properties (e.g., strength) of the substrate, as discussed above, which may be accomplished by applying an additive material to the substrate either during or prior to the applying the vibration. In addition, the inventor has found that it may be desirable to enhance the properties (e.g., strength) of the resulting fastener elements formed on the substrate. According to one aspect, materials with differing melt temperature or melt properties may be introduced before, during or after the formation. In one embodiment, the substrate itself may include multiple materials that behave differently at different processing temperatures. In another embodiment, a laminating material having material properties different than the substrate may be introduced before, during or after the formation. The inventor has found, by experimentation, that when a nonwoven substrate constructed with an elastomeric film embedded within the substrate was ultrasonically processed, the elastomeric film material (having different material properties, such as a different melt property, than the material of the nonwoven substrate) was softened and forced between the fibers of the nonwoven substrate and into the mold cavities. This resulted in hooks having elastomeric properties on the surface of the substrate. The nonwoven fibers of the substrate were minimally affected during the processing, with most fibers remaining predominately in the plane of the substrate. The inventor has also found, by experimentation, that when a polymer film with a lower melt temperature than the substrate material was introduced between the ultrasonic horn and the nonwoven substrate, the polymer film was softened, forced through the fibers of the nonwoven substrate and into the mold cavities, leaving the nonwoven fibers predominately in the plane of the substrate. Thus, the inventor has found that when producing product from multilayered substrates, it is possible to selectively form the fastener elements from one or more of the layered materials within the substrate based on the material properties (e.g., melt properties, melt temperature, etc.) of a particular layer of material.

The inventor also found that adding powdered material to the back of the substrate (i.e., the surface opposite to the mold cavities, that is opposite to where the fastener elements will be formed) or sprinkled onto the mold such that some of the powder enters the cavities may enhance the properties of the fastener elements. The inventor has found, by experimentation, that when powder was applied to the back surface of the substrate and the substrate was passed between a mold roll and ultrasonic device, the powder was distributed in the softened substrate and served to modify the properties of the substrate and of the formed projections. In one experiment conducted by the inventor, corn starch was dusted onto a substrate, specifically onto the back of a laminated nonwoven substrate having a top layer of polypro SMS (more formally known as polypropylene spunbonded melt blown spunbonded), a center layer of elastomeric film and a bottom layer of polypro SMS. The dusted SMS substrate was fed into the ultrasonic forming device to form hooks. The laminated substrate appeared unchanged while the formed hooks appeared to internally contain particles of corn starch. This corn starch served to stiffen the hooks, improving their fastening strength. In another experiment conducted by the inventor, the same substrate without the addition of corn starch had been used to ultrasonically form hooks and the inventor determined that the elastomeric center film softened before the SMS layers and filled the cavities producing an extremely soft hook element that may be too weak to serve as a fastener element.

In another embodiment, the cavities may be filled or partially filled with a material including but not limited to a liquid material that may serve to reinforce any substrate material that is forced into the mold cavity. One such material may be a liquid or an adhesive-like material that may be applied in liquid form into the cavity before a nonwoven substrate is exposed to the vibrational energy. The adhesive-like material may saturate or coat any fibers that enter or partially enter a cavity and serve to stiffen or render more resilient the resultant fastener element (e.g., hook) formed during the ultrasonic processing of the fastener element. In one embodiment a water based adhesive, such as Elmer's® brand glue, is deposited into the cavities and a paper material is introduced between the mold and the vibrational energy source. A portion of the paper enters the cavities and the adhesive saturates or coats the fibers that enter the cavity, imparting improved properties to the resultant formed fastener elements. In some embodiments, it may be necessary to post-form the projections as the adhesive continues to dry and/or cure. Other substrate materials susceptible to at least partial wetting or saturation by the adhesive may also be employed.

Accordingly, such additives applied to the substrate or to the cavities used to form the fastener elements may include, but is not limited to, powder materials, fiber materials, metal materials, liquids and adhesives, with such additives being applied prior to or during the formation of the fastener elements.

According to another aspect, the inventor has found that in some instances there may not be a sufficient amount of substrate material available to form a complete fastener element by the ultrasonic forming process. In this regard, when forming fastener elements on a single layer of thin substrate material, there may be difficulty creating fully formed fastener elements due to the lack of material available adjacent to the cavity to fill the cavity during the ultrasonic formation process. During experiments conducted by the inventor, using a substrate of SMS material having a mass of 40 to 60 grams per square meter (which is currently being used by major diaper manufacturers), it was common to produce only partially formed hook elements. There was insufficient material available to fill cavities and yet have sufficient material to act as the substrate carrier for the hook elements. One way to avoid such a problem would be to reduce the cavity volume or quantity of cavities, though such a solution may not be an option where larger fastener elements or increased fastener field density is desired. Another solution may be to use a thicker substrate, but this may not be appealing from a cost point of view. Another solution may be to provide a supplemental material such as a film or nonwoven material, again resulting in increased cost and material handling complexity.

The inventor has found that "gathering" a portion of the thin substrate immediately before it enters the nip between the mold and the ultrasonic horn can provide the necessary amount of material to appropriately fill the cavities when forming the fastener elements. Although the "gathering" may be done in the machine direction "MD" (that is the direction that the substrate is feed from a roll of substrate material through the ultrasonic forming process and collected downstream of the forming station) or the cross direction "CD" (that is, the direction transverse to the MD), gathering in the CD may be more preferable for diaper tab applications because the fastener area or field is typically a narrow field or lane running down the length of a wider substrate. By gathering the substrate in the CD direction, the extra material created by the gathering can be applied specifically to the lane where the fastener elements are to be formed. In one embodiment, material is gathered in a pleated fashion allowing the volume of substrate in the forming zone to be set as desired. In this regard, tighter pleats equates to more material available for forming the fastener elements. In one embodiment, a device may be used to channel the substrate in a way that forms the pleats. In addition or in the alternative, the leading edge of the ultrasonic device can have similar pleats to maintain the material in the desired location. Further, the pleats need not completely fold over onto themselves to provide a multilayered folded substrate; rather, the pleats may be formed with a frequency that does not result in overlapping the substrate material yet is sufficient to gather enough material to allow the fastener elements to be fully formed.

One of the disadvantages of conventional molded hook touch fastener strip or component is the difficulty in sewing onto another product. The molded touch fastener has a much lower tear resistance than the textile material it is attached to and so the touch fastener strip often tears away from the product when a load is applied. According to another aspect, utilizing vibrational energy to form fastener elements on a substrate may allow for greater ease of attaching the substrate to another product, such as clothing, luggage, etc. In this regard, assuming for some reason it is less desirable to form the fastener elements on the product itself, utilizing ultrasonic formation of the fastener elements such that the fastener elements are formed directly onto a textile or nonwoven substrate allows the resultant touch fastener strip to be readily sewn to another product. The projections may be intermittently formed on a sewable substrate in such a fashion so as to maintain the sewability of the substrate. If desired, additional patterns may be ultrasonically formed into the substrate to improve the tear resistance or enhance the sewability of the fastener strip so formed.

Although the term "hook" or "hook element" is used herein when referring to a fastener element, it is understood that fastener elements are not limited to hook-like shapes and may be in the shape of mushrooms, tees, hooks, multi-lobed hooks, pins, projections or other shapes as desired. Such shapes may act as fastener elements as formed or may be post formed to make them suitable as a fastener for use in touch fastener. Further, the term "projection" or "pin" may refer to an element that by itself or through a post forming operation can function as a fastener element. Further, the terms "fastener element" and "fastening elements" are used interchangeably herein.

"Loop" or "loop material" may include any structure or material that is suitable for mating with a fastener element, such as for example a hook element. The loop may be formed from a woven, nonwoven, foam, screen or mesh substrate or combinations thereof.

"Elastomeric substrate" is a substrate (such as, but not limited to, the kind described above) that is formed entirely or partially with elastomeric material in the form of fibers or films or may be a laminate structure with the elastomeric material laminated to a non-elastomeric substrate.

It should be appreciated that aspect of the disclosure are not limited to a specific type of vibrational energy source used to soften the substrate to from the fastener elements. In some embodiments, ultrasonic energy is described as the vibrational energy employed, though in those embodiments, one of skill would recognize that other forms of vibrational energy may be employed and thus the present disclosure is not limited in this regard.

Turning now to the figures, several non-limiting embodiments regarding a touch fastener integrally formed in a substrate as well as embodiments of methods of manufacture are described in more detail. However, it should be understood that the current disclosure is not limited to only the particular embodiments described herein. Instead, the various embodiments and individual features may be combined in any appropriate combination as the disclosure is not so limited.

Hooks, or other suitable fastener elements (e.g., loops, pin, protrusions, projections, etc.), may be formed according to any suitable configuration. In various embodiments, as shown in FIGS. 1A-1D, hooks 19 of a fastening surface are depicted and may be located within at least a portion of a recess 23 of a substrate 21. In some cases, the hooks 19 are integrally formed on the surface (e.g., within the recess) of the substrate 21. As illustrated, the base 20 where the hook(s) 19 are attached to the substrate 21 may be located within a recess 23, spaced inward from the upper surface 22 of the substrate 21. The base 20 may include a fillet region, as shown. Again, to reemphasize, although hooks are depicted in this disclosure, other suitable fastener elements may be employed, as aspects of the disclosure are not limited in this regard.

The hooks 19 may be formed on a portion of or the entire surface of the substrate. For example, as described herein, the hooks 19 may be formed in a patterned arrangement, such as in a striped, grid-like, irregular, or other configuration, along the surface of the substrate 21. As shown in FIGS. 1A-1D, the hooks 19 are formed on a portion of the substrate 21, with the upper surface 22 of the substrate 21 surrounding the hooks 19.

Figure 1B:
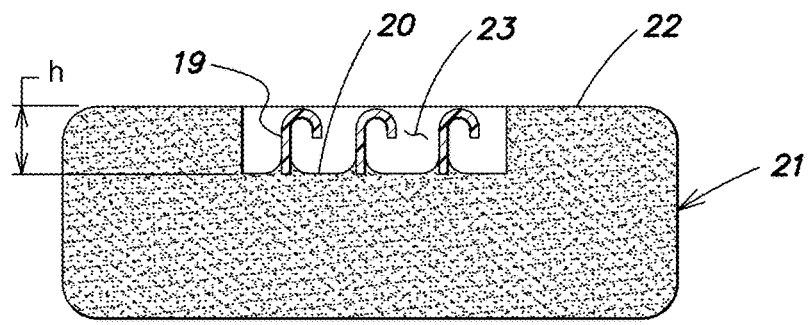

As further shown, the hooks 19 may be formed so as to have any suitable height h. The height h of one or more hooks may reach from the base 20 of the hook(s) above, at or below the corresponding surface 22 of the substrate 21. For example, FIG. 1A depicts an embodiment where the height h of the hooks 19 is sufficiently large such that the hooks 19 protrude or otherwise reach above the upper surface 22 of the substrate 21. Alternatively, FIG. 1B shows an embodiment where the upper surface 22 of the substrate 21 is lofted relative to the hooks 19 such that the upper surface 22 is approximately even, or higher, than the highest reach of the hooks 19. While the height h of each of the hooks in the embodiments illustrated in FIGS. 1A-1D is shown to be uniform, it can be appreciated that for some embodiments, the height h of various hooks in a single embodiment may vary, as desired.

In some embodiments, the hooks or other fastening elements may be formed on to an elastomeric non-woven substrate material. The elastomeric portion of the non-woven substrate material may provide for an added level of flexibility for the overall substrate. As described further herein, this elastomeric portion may be integrated with other material(s) of the substrate by any suitable method, for example, by impregnation, lamination and/or another appropriate method.

Figure 1C:
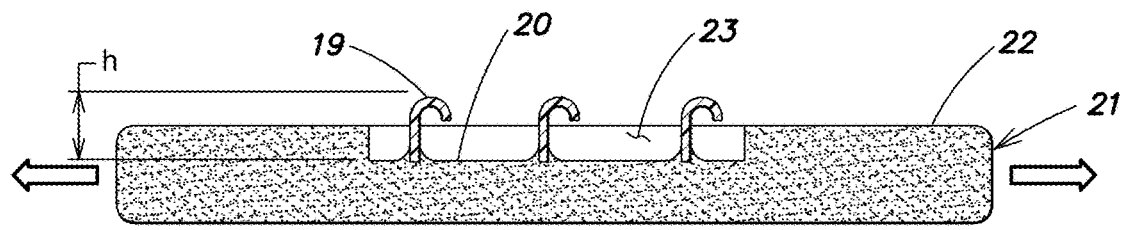

FIGS. 1B and 1C depict an embodiment where hooks 19 are formed within a recess 23 defined by an elastomeric non-woven substrate 21. In FIG. 1B, the elastomeric substrate 21 is in a relaxed state, and in FIG. 1C, the elastomeric substrate 21 is in a stretched state. For certain embodiments, it may be preferable for the substrate material to be elastomeric or exhibit a greater degree of flexibility and/or elasticity than would otherwise be the case without the elastomeric material. This enhanced level of flexibility and/or elasticity may be desirable, for example, in a part of the diaper that is often handled and/or is subject to frequent motion. In some instances, it may be irritating for such portions of the diaper, which exhibit constant motion, to be overly rigid.

When the elastomeric substrate 21 is in a relaxed state, such as that shown in FIG. 1B, the substrate 21 may have a tendency to loft over and/or around the hooks 19, approaching the height of the hooks. Here, the hooks remain approximately at or below (or just slightly above) the upper surface 22 of the substrate 21. Accordingly, by not protruding upward above the substrate by a significant amount, the hooks may be effectively shielded by the substrate. In some embodiments, such shielding of the hooks may provide protection or otherwise limit physical exposure of the hooks, making them less prone to undesirable contact with other objects and/or incurring damage. In such cases, when the hooks are shielded from physical exposure with other objects, the overall surface of the material may exhibit a relatively smooth tactile feel, as compared to a more abrasive feel if the hooks protrude over the upper surface 22 of the substrate 21. That is, the abrasive tactile feel of the hooks is obstructed or otherwise reduced when the substrate is suitably lofted above the hooks. In some instances, it may be preferable for a product (e.g., diaper, garment, etc.) having fastening hooks formed thereon to exhibit a low level of abrasiveness, for example, when rubbed against the skin. Having the substrate lofted above the hooks may reduce the abrasiveness that would otherwise be felt. Such shielding may also limit or obstruct the hooks 19 from pre-mature engagement with corresponding fastener elements, such as loop structures.

When the elastomeric substrate 21 is in a stretched state (e.g., pulled by a user along the depicted bold arrows), such as that shown in FIG. 1C, the substrate may become thinner, as depicted, and the hooks 19, or other fastening elements, may bloom or otherwise extend over the upper surface 22 of the substrate by an amount sufficient to engage a mating fastening structure. Accordingly, when the elastomeric substrate is stretched, the hooks 19 may be suitably exposed and presented in a preferred orientation that facilitates engagement and/or attachment with one or more corresponding loops and/or other fastening elements. In some embodiments, when the substrate 21 is stretched, the hooks may extend further above the upper surface 22 of the substrate, or may remain at the same height h as compared to the height before stretching.

In some embodiments, and as further shown in FIG. 1C, stretching of the elastomeric substrate may also cause individual hooks to become more spread apart from one another. Hence, when the elastomeric substrate 21 is still in a stretched state (e.g., with respective hooks in a bloomed and spread apart state), the hooks 19 may be brought into contact with fastening elements that are suitably structured for mutual engagement. When in close enough proximity and/or contact with a surface having corresponding fastening elements, the elastomeric substrate may be released, resulting in the hooks retracting back toward a resting configuration, such as that shown in FIG. 1B, where the substrate 21 becomes thicker and the hooks 19 become spaced closer together. This results in the hooks 19 latching and/or grasping on to the corresponding loops and/or other fastening elements in a more effective manner than would otherwise be the case if the elastomeric substrate were not stretched prior to mutual engagement. For example, allowing the individual hooks to be brought closer together upon release of the elastomeric substrate, while having latched on to the respective loops and/or other fastening elements. This raking of the hooks may strengthen the overall attachment between complementary materials. Also, lofting of the substrate such that the hooks, relatively speaking, retract back into the recess 23 of the substrate 21 may pull the loops and/or other fastening elements in toward the hooks, also resulting in a relatively strong attachment between complementary materials.

In some embodiments, an elastomeric non-woven substrate 21 may be maintained in a stretched condition while patterns of fastening elements (e.g., hooks) are ultrasonically formed. Hence, when the substrate is allowed to retract after forming of the fastening elements thereon, the fastening elements may naturally shift closer together so as to increase the density of elements, while maintaining the ability of the substrate to be stretched as desired. This provides for a relatively dense field of fastening elements when the elastomeric substrate is in a resting, non-stretched state. If the density of the field of fastening elements is high enough, when in a non-stretched state, the overall fastening surface may be relatively smooth to the touch. However, when the substrate is stretched, the density of the field of fastening elements may decrease, leading to a more abrasive tactile feel of the overall fastening surface. Though, as the substrate is released, if the hook elements are in mating contact with corresponding loop fields, the hooks may then exhibit a raking action, resulting in a relatively strong closure between mating surfaces.

Figure 1D:
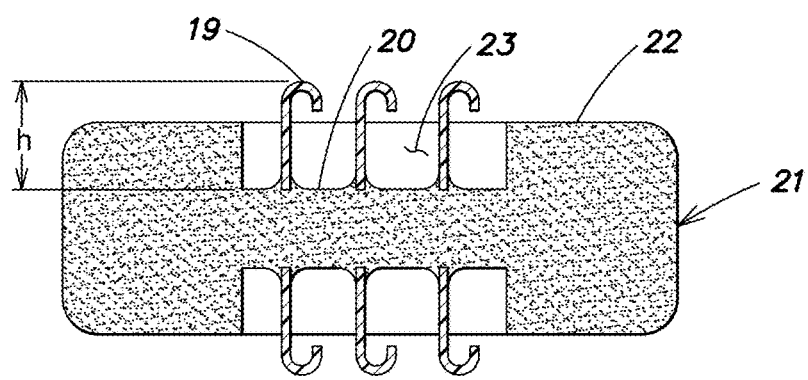

It can be appreciated that any suitable type of fastening element (e.g., hooks, loops, projections, pins, etc.) may be formed on any side of the substrate, according to any suitable arrangement. For example, as shown in FIG. 1D, hooks may be formed on more than one side of the substrate. Here, hooks 19 are formed on opposite sides of the substrate 21. Accordingly, for this embodiment, a complementary material (e.g., having appropriate loops) may be attached on one or both sides of the substrate.

As noted above, in some cases, loop portions may be constructed so as to be lofted relative to the hooks. Alternatively, or in combination, the substrate may be stretched during formation of the hooks, so that when the substrate is relaxed, the loop portions are able to loft to a greater extent toward and/or above the top of the hooks. The substrate may also be processed so as to provide a patterned arrangement of hooks, loops and/or other fastening elements on both the front and back surfaces. Accordingly, fastening strips may be mated to themselves and/or other fastening strips on the front and/or back surface, such as when used as a cable wrap.

In some embodiments, the substrate may include one or more surfaces, or portions thereof, that may have hook and/or loop components. That is, rather than forming hooks or a single type of fastening element on an entire surface of a substrate, different types of fastening elements may be formed on the substrate, such as in a patterned arrangement. For example, in accordance with methods described herein, hook elements may be formed directly on one or more surfaces that had previously included loop elements. That is, where the substrate may have originally had a region of loops and/or other elements, hooks and/or other fastening elements may be formed directly in their place. For instance, the original elements may be heated, melted, reshaped or otherwise reformed using methods in accordance with the present disclosure, to result in hooks and/or other types of fastening elements such that the fastener element is formed from the loop material itself.

Accordingly, for some embodiments, hooks may be formed intermittently on one or more surfaces that had originally included only loops. Such a material thus formed, having both hook and loop structures, may be capable of mating to itself. For instance, forming hook elements on the back side of a substrate originally covered only with loops may allow the product to be wrapped around an object and engaged to itself. Also, the loop material or loop structure itself may be forced into mold cavities to form fastening elements on the otherwise loop substrate. Such a substrate with loops provided thereon may include any suitable material, such as a nonwoven, woven, textile, polymer, foam, fibrous material, other suitable materials, or combinations thereof.

As noted above, a self-engaging fastener strip may be formed by selective patterning of hooks or hook fields directly onto a suitable elastomeric loop substrate. For example, hook fields may be patterned on a loop substrate in any suitable configuration. In some embodiments, hooks and loops may be formed in a checkerboard, striped and/or other patterned arrangement, which may allow for hooks and loops to be suitably available for mutual engagement when surfaces are mated face to face. That is, patterned surfaces with both hook and loop fields may be appropriately mated when brought together into mutual contact.

In some embodiments, to achieve a strong attachment, it may be preferable for the surface of a touch fastener to include numerous leading and trailing edges where, when fastening products are peeled from one another, the leading edge is the edge of a field of fastening elements that is first removed, and the trailing edge is the last part of the field of fastening elements that is removed. It has been observed that when attaching hook and loop touch fasteners to one another, there tends to be improved engagement between fasteners along leading and trailing edges of a hook field. That is, the more leading and trailing edges there are between touch fasteners, the more difficult it may be to separate them from one another. Without wishing to be bound by theory, this may be due, at least in part, to the increased quantity of fastener elements engaged or readily engageable—that is, the fastener elements are not shielded by adjacent fastener elements and may be able to penetrate the mating material more easily. Fastening surfaces having more surface area may exhibit a greater ability to mutually engage as opposed to fastening surfaces having comparatively less surface area.

Hence, the attachment between one surface that is formed entirely of hook elements and another surface formed entirely of loop elements may not be as strong as the attachment between two complementary surfaces each formed of a striped, checkerboard and/or other suitable arrangement of hook and loop fields. Or, in some embodiments, it may be preferable to form an attachment between one surface formed of a striped or grid-like pattern of hook elements and another surface formed entirely of loop elements, or vice versa. By forming the fastener element in discrete patterns, such as rows/columns and/or patches, more leading and trailing edges may be made available for engagement between fastening surfaces, thus, providing a more secure attachment.

FIG. 2A shows an illustrative embodiment of a fastening surface having a striped pattern of hooks 19 formed directly on an elastomeric non-woven substrate 21. FIG. 2A further shows the striped fields of hooks 19 separated from one another by edges 40a, 40b, with virgin substrate material located between stripes. As discussed above, these edges 40a, 40b may serve as leading and trailing edges for enhancing attachment between fastening surfaces. For example, the fastening surface having the striped pattern of hooks 19 formed from the elastomeric substrate 21 may form a relatively stronger attachment to a surface entirely of loops as compared to an attachment between a fastening surface formed entirely of hooks 19 and a surface entirely of loops.

In some cases, material processed to form hooks or other fastening elements may be formed to be relatively stiffer in comparison to the substrate material that has not yet been processed. That is, processed substrate material may be stiffer than non-processed substrate material. Thus, the remaining stripes of virgin substrate material may desirably provide an added degree of flexibility for the overall product.

In one embodiment of a fastening surface, fastening elements are formed according to a patterned arrangement. In this embodiment, patches of hooks are formed on an elastomeric non-woven substrate material. In various embodiments, where elements are formed as an individual element and/or a patch of elements, the portion of the elastomeric non-woven material surrounding the element(s) may remain unaltered. This may, for example, allow for the formation of intermittent patches of hooks or other fastening elements directly on to the substrate material (e.g., material forming a diaper tab), optionally leaving a relatively bald perimeter area (e.g., of elastomeric non-woven material) around the hook field. This bald or unaltered perimeter may provide a relatively soft and low stiffness material which, in some cases, may limit marking and/or irritation for a user (e.g., wearer of a diaper, garment, etc.) of the fastening product.

It can be appreciated that fastening elements may be patterned on to a substrate according to any suitable arrangement. Such patterns may be located intermittently along the surface of the substrate and/or may include, for example, lines, stripes, circles, arcs, ellipses, ovals, squares, rectangles, angled lines, patches, logos, etc.

Figure 2B:
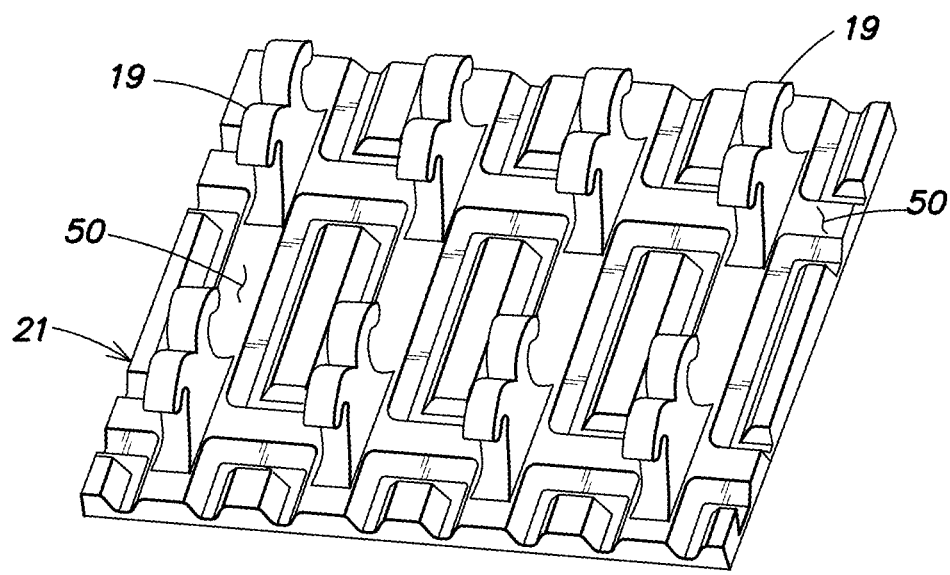

In some embodiments, it may be desirable to reinforce various regions of the substrate. For instance, using material from the substrate to form the fastening elements may result in a reduction in overall strength, stiffness, etc. of the substrate. Accordingly, a reinforcing structure may be provided on the substrate, for strengthening and/or stiffening thereof. For example, ultrasonic energy may be used to modify the substrate material adjacent to and/or between elements or patches of elements to form such reinforcing structures. FIG. 2B shows reinforcing elements 50 provided as ribs or ridges that are vibrationally formed from the substrate 21. Such reinforcing elements 50 may be formed adjacent to or as part of certain fastening elements to provide support thereto and/or for the substrate as a whole. The reinforcing elements 50 may be formed so as to be connected to the sides of fastener elements 19 and/or the fronts of the fastener elements in such a manner as to provide side support and/or front/back support to the fastener element and may serve to reinforce fastener elements from various directional forces. Furthermore, depressing the substrate in the region adjacent the berms 50 allows that material to be utilized for the formation of the fastener element. That is, without the corresponding depression, there may be insufficient volume of material necessary to form a complete fastening element. The reinforcing elements may be compacted to a greater or lesser extent than the compaction of the fastening elements.

Figure 2C:
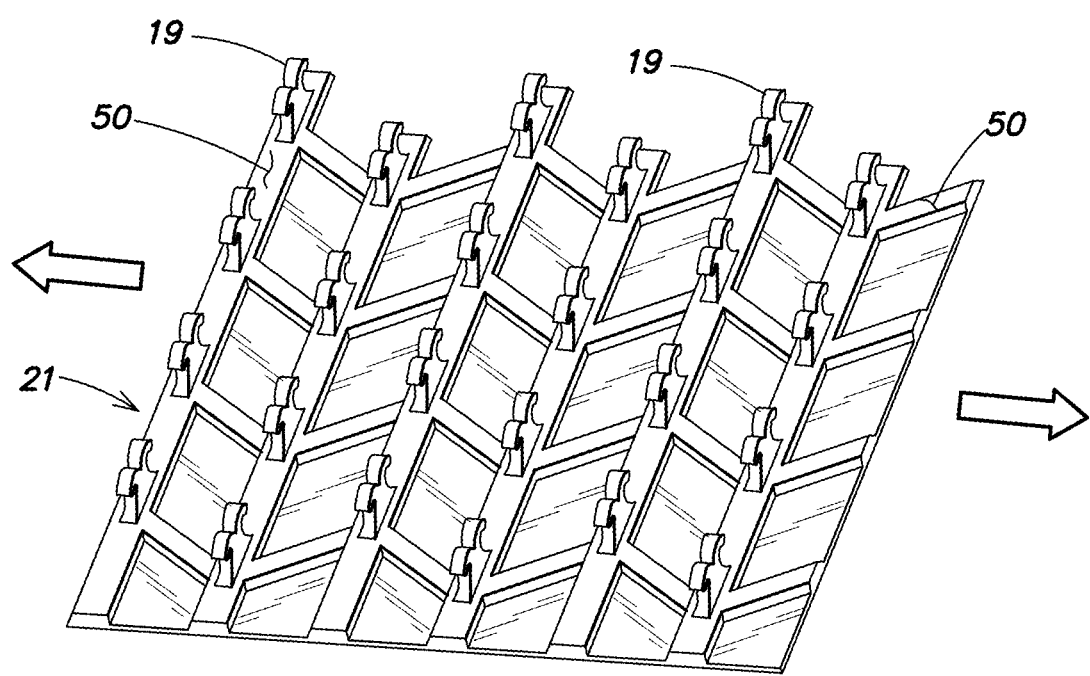

In one embodiment, as shown in FIG. 2C, the substrate 21 may be formed with berms 50 placed in a zig-zag pattern. When configured in a zigzag or other compliant pattern, the resulting structure may serve to limit stretch of the substrate (in the direction of the arrows) when used on elastomeric substrates when a stretching force is applied thereto.

Figure 2D:
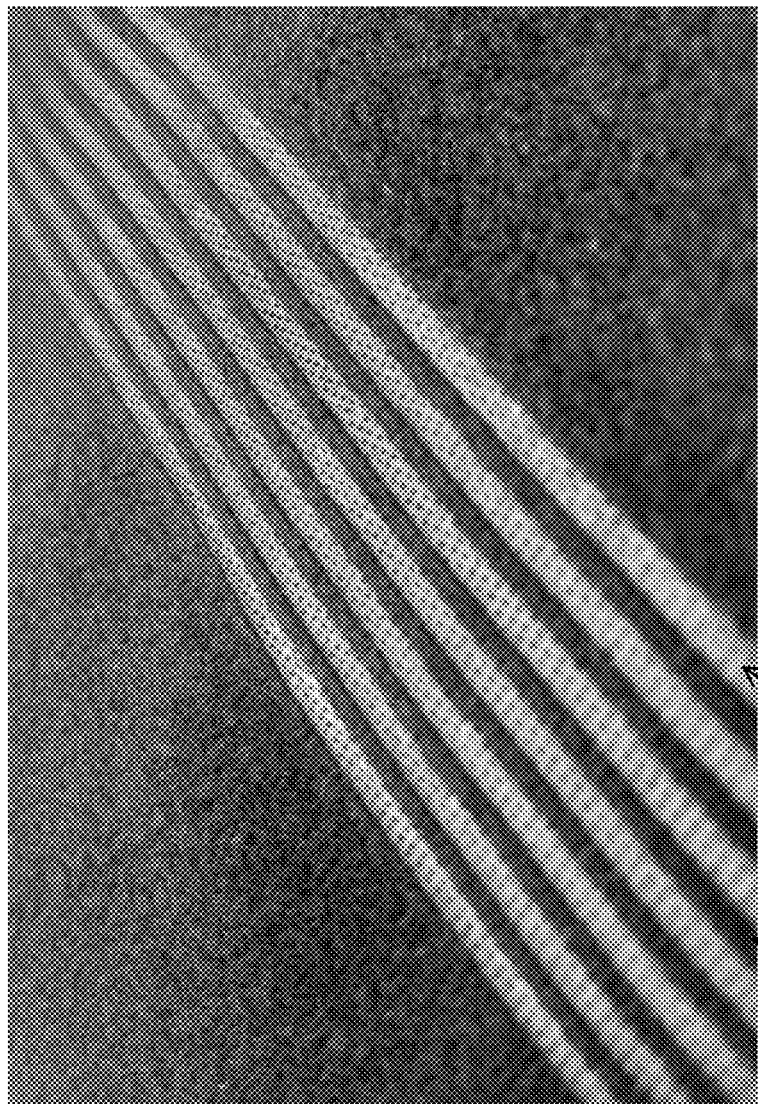

As described herein, rather than forming a single type of fastening element on an entire surface of a fastening product or sheet, it may be preferable to form patterns of different types of fastening elements along the surface. In accordance with aspects of the present disclosure, fields of hooks may be formed on a substrate previously having loops on the entirety of the surface. For example, FIG. 2D shows an illustrative embodiment of a fastening surface having a striped pattern of alternating fields of hooks 19 and loops 30, with the fields of loops 30 lofted over the fields of hooks 19. By virtue of the striped pattern, the fields of hooks 19 and loops 30 include a number of leading and trailing edges. In various embodiments, including that shown in FIG. 2D, the hooks 19 may be formed on a substrate previously having loops 30 on the entirety of the surface. That is, in accordance with aspects of the present disclosure, loops on a substrate may effectively be changed into hooks. For instance, a vibrating source such as an ultrasonic transducer/horn may be placed into contact with a region of loops, melting and/or softening that portion of the substrate. A suitable mold having appropriately shaped cavities may be applied to the softened portion of the substrate, forming hooks directly on regions of the substrate that had previously been loops where the loop material or loop structure itself is forced into mold cavities to form fastening elements.

Figure 3A:
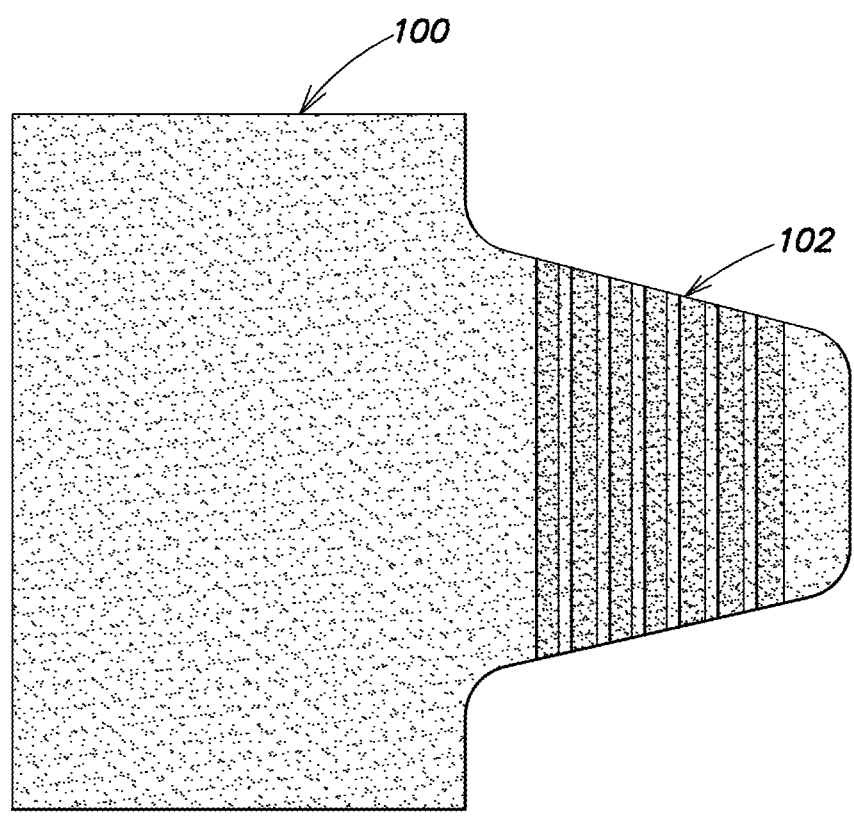
FIGS. 3A-3B illustrate fastening elements formed on another substrate in accordance with some embodiments.
Figure 3B:
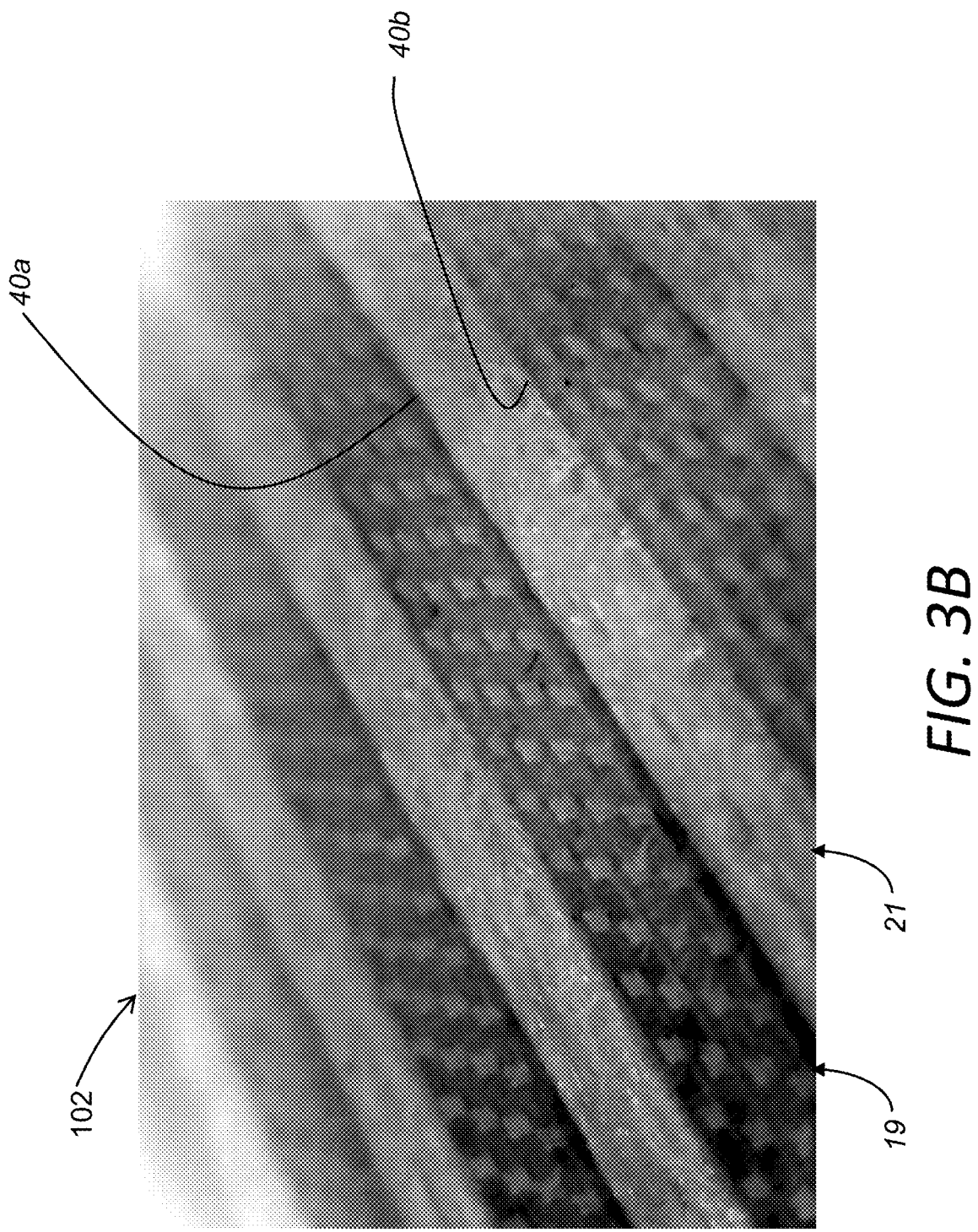

FIGS. 3A-3B depict an embodiment of a fastening surface that may be suitable for use with infant diapers. In this embodiment, the product 100 (e.g., diaper tab material) may be an elastomeric fibrous non-woven material having a side tab 102 on which appropriate touch fasteners are directly formed. A user may press the touch fasteners on the side tab 102 against an appropriate fastening surface (e.g., a landing field on the diaper, or other portions of the diaper, such as the shell of the diaper, or other areas having suitable mating features), for example, in securing a diaper to an infant, or holding portions of a garment together. In some embodiments, such tabs 102 may be constructed with a piece of extensible material (e.g., elastomer) that allows the tab to stretch and flex when attached and/or upon movement of the wearer (e.g., infant, child). In some embodiments, a separate fastening material having the fastening elements is affixed to the side tab 102, as is often the case for diapers. Though, in accordance with aspects of the present disclosure, the fastening elements may be formed directly on the side tab 102. For example, a vibrating source and mold may be applied directly to the elastomeric fibrous non-woven material provided for the side tab 102 so that the side tab itself has the fastening elements formed integrally thereon. FIG. 3B is a close-up view of a portion of the tab shown in FIG. 3A, more readily showing a striped fields of hooks 19 separated from one another by edges 40*a*, 40*b*, with virgin substrate material 21 located between stripes. As discussed above, these edges 40*a*, 40*b* may serve as leading and trailing edges for enhancing attachment between fastening surfaces.

Figure 4:
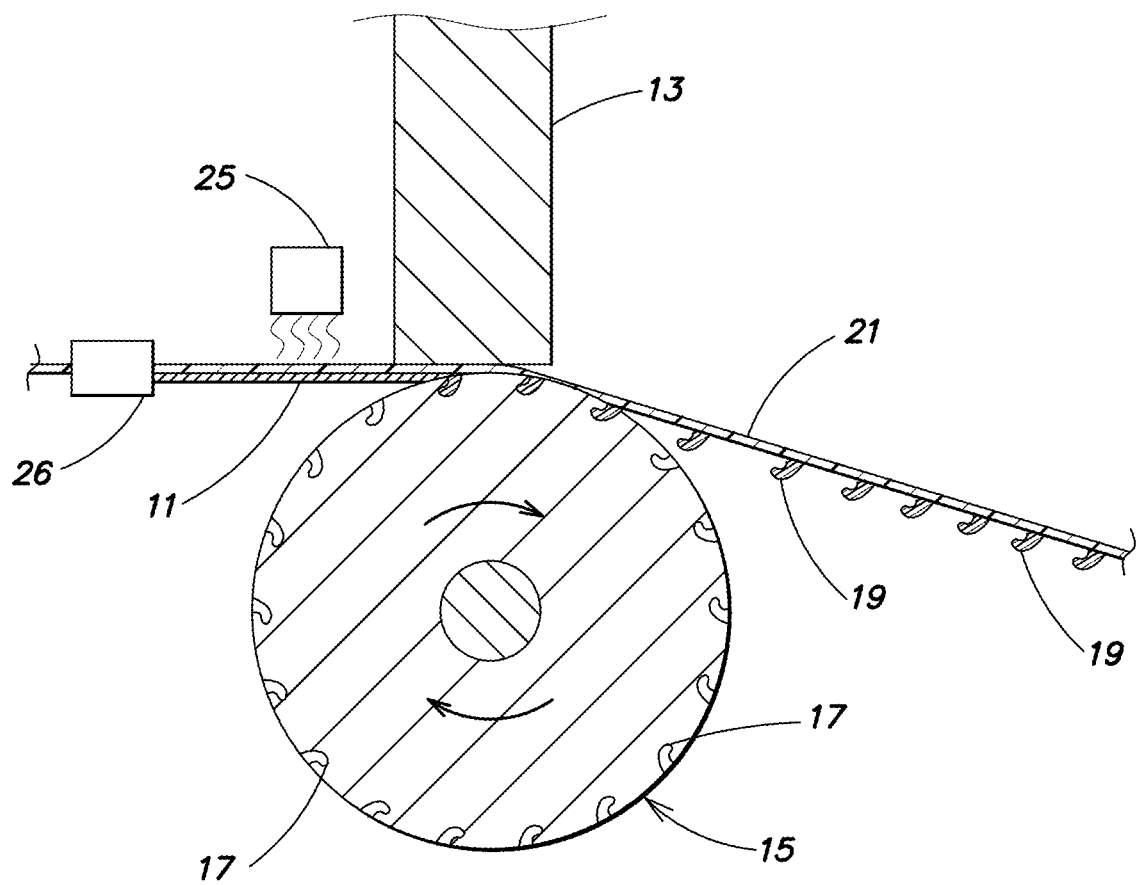
FIG. 4 shows a process for manufacturing fastening elements in accordance with some embodiments.

Fastening materials may be manufactured according to any suitable process. In accordance with aspects of the present disclosure, such manufacturing processes may employ ultrasonic and/or vibrational energy to locally soften or otherwise operate on the material from which fastening elements (e.g., projections, protrusions, pins, hooks, mushroom heads, loops, etc.) are formed. FIG. 4, discussed further below, shows an exemplary embodiment where a forming substrate 11 (e.g., made up of elastomeric material, non-woven material, woven material, thermoplastic material, etc.) is positioned and passed between a vibrating source 13 (e.g., ultrasonic source) and a mold 15 (e.g., rotating mold roll). In this embodiment, the mold 15 includes multiple hook-shaped or other suitably shaped cavities 17 along the outer periphery from which appropriately shaped hooks, or other fastening elements, may be formed.

It can be appreciated that fastening materials may be manufactured according to appropriate processes using different configurations. In some embodiments, the molding roll may itself include a vibrating source that provides appropriate energy for softening and/or forming the fastening elements. In some embodiments, a molding roll is not required, as the fastening materials may be formed along a conveyor, stamping configuration and/or according to another suitable manufacturing arrangement. In some embodiments, the source of vibration (e.g., ultrasonic vibration) may be provided by a vibrating horn. The horn may have a curved surface that corresponds to the curvature of the molding roll. In some embodiments, multiple ultrasonic horns may be employed.

During operation, the vibrating source 13 may be positioned in relatively close proximity to, yet spaced from, the outer surface of the rotating molding roll 15. The vibrating source 13 may come into contact with the forming substrate 11 as it passes through. In various embodiments, the vibrating source 13 may include, but is not limited to, for example, an ultrasonic horn. Such horns may be made from any appropriate material (e.g., metals such as aluminum or titanium, piezoelectric materials) and are sold in the United States by companies such as Branson Ultrasonics, Dukane or Sonitek, and in Europe by a company such as Mecasonics. The vibrating source 13 may vibrated at any suitable range of frequencies, such as between about 50 Hz to about 50 kHz, or alternatively as desirable. Other sources of vibration energy may be utilized, including but not limited to, a rotating eccentric roller, high pressure sound waves or other mechanical and/or electromechanical or acoustical forms of vibration energy. Such energy may therefore be transferred to a substrate and assist in the formation of fastening elements described herein.

As shown in FIG. 4, the fastening product may be formed by rotary forming. Accordingly, when coming into contact with the molding roll 15 and vibrating source 13, the forming substrate 11 may be appropriately softened by vibrational energy. Hence, a softened portion of the substrate may be caused to enter into cavities 17 of the molding roll, forming hook-shaped or other suitably shaped elements or projections 19 on the front surface of the film or sheet 21 as the roll turns. The forming substrate 11 may include, but not be limited to, a film, sheet, web, composite, laminate or other form, or may be portions of a film, sheet, web, laminate, thermoplastic, non-thermoplastic, woven, non-woven, fibrous and/or elastomeric material, which may be used as forming material for individual fastening tabs, for instance on a disposable infant diaper, or which may be used as forming material for the disposable infant diaper itself (e.g., the shell of the diaper). In the depicted embodiment, the substrate is a two-layer laminate, though the disclosure is not limited in this regard.

In some embodiments, a suitable amount of force/pressure may be applied to the substrate 11 to assist in causing a sufficient amount of the substrate material to enter and fill-out the cavities 17.

In some embodiments, the formed substrate 21 (that is, the substrate having the fastener elements now formed thereon) may function as a carrying strip for the fastener elements (e.g., hooks) 19.

In some embodiments, the material of the initial substrate 11 (i.e., before fastener formation) is the same as the material of the formed substrate 21. In other embodiments, such as when a laminating material or powder is introduced during the forming of the fasteners, the formed substrate 21 may have a different material composition that the initial substrate 11.

As discussed above, the substrate may be heated to a temperature around or just below its melting point prior to or during the vibrational forming of fastening elements. In some embodiments, the temperature may be raised to approximately the glass transition temperature of the substrate material (e.g., glass transition temperature of polyethylene, polyurethane, nylon, polypropylene, polyimide, polyamide, rubber, polyisoprene, polybutadiene, polyneoprene, etc.). For instance, the temperature at around or the substrate during processing may be raised to greater than 30° C., greater than 40° C., greater than 50° C., greater than 60° C., greater than 70° C., greater than 80° C., greater than 90° C., or greater than 100° C.; or less than 100° C., less than 90° C., less than 80° C., less than 70° C., less than 60° C., less than 50° C., less than 40° C., or less than 30° C. Combinations of the above noted ranges may be possible, or temperature outside of these ranges. As a result of such heating, the overall efficiency of production may be enhanced. For example, heating of the substrate may result in an increase in the line speed of manufacture and/or require less vibrational energy than would otherwise be needed for adequate material to enter the cavities and ultimately form the fastening elements.

FIG. 4 further shows heating devices 25, 26 used to heat the forming substrate 11 as it moves toward the vibrating source 13 and the mold 15. As shown, the heating device 25 provides convective and/or radiative thermal energy toward the forming substrate 11. In addition or in the alternative, a heating device 26 is provided as a heater through which the substrate 11 travels prior to processing between the vibrating source 13 and the mold 15. Any suitable heating device(s) may be used, such as for example, a heat lamp, filament, hot air blower, oven, or any other suitable unit for applying thermal energy. It can be appreciated that the substrate may be heated by any suitable method. As noted above, for some embodiments, the substrate may be heated before, during and/or after forming via the vibrating source and mold.

As described herein, fabrication of the fastening elements may require a sufficient amount of substrate material; otherwise as portions of the substrate material are softened, there may be difficulty in fully filling cavities provided by the mold, for suitably forming the fastener elements. Though, for some applications (e.g., diapers), it may be preferable for the substrate material to be suitably lightweight (e.g., spun-melt-spun material used by diaper manufacturers may have a mass ranging between 40-60 g/m$^2$).

Thus, in attempting to stay within a certain weight and/or mass, while also leaving a sufficient amount of material as a backing, it may be common for fastening elements to be only partially formed. To ensure that enough substrate material is available for adequate forming of the fastening elements, it may be possible to reduce the cavity volume, form smaller fastening elements, and/or decrease the density/quantity of cavities over a certain area, resulting in the formation of smaller sized and/or a smaller number of fastening elements.

Alternatively, in accordance with aspects of the present disclosure, as discussed above, it may be preferable to thicken or otherwise increase the available amount of material where touch fasteners are formed. In one embodiment, the substrate may be pre-formed such that there exists additional material (i.e., bulking up of the material) at the location where the fastener element is to be formed. Thus, a first area of the substrate is gathered to a second area of the substrate and fastener elements are formed in the second area. The second area may be smaller than the first area. FIGS. 5A-5D illustrate various embodiments where the amount of local substrate material available for forming the fastening elements is increased using an otherwise constant thickness material. In some embodiments, such gathering may involve collecting a portion of the substrate material prior to formation of the fastening elements (e.g., passing of the substrate forming material between a mold and ultrasonic horn). The thickening or gathering may be formed intermittently on the substrate, as the present disclosure is not limited in this regard.

Figure 5A:
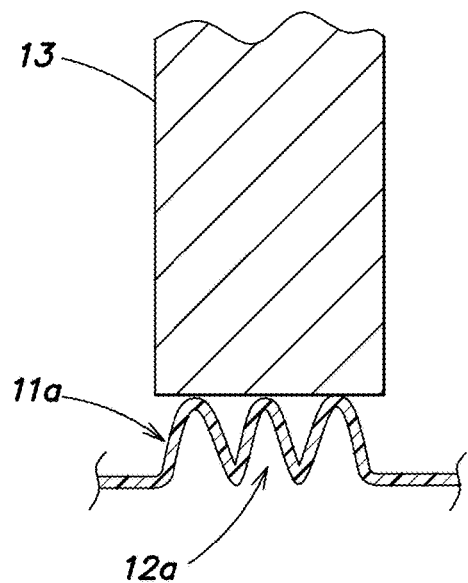
FIGS. 5A-5D depict gathering of substrate material for further processing in accordance with some embodiments.

For instance, FIG. 5A shows an embodiment where substrate material 11a is gathered so as to form pleats 12a, providing an added volume of material under the vibrating source 13 for forming of fastening elements that are suitably sized. As noted above, the pleats 12a along the substrate may have any suitable shape or configuration (e.g., waves, corrugations, etc.), depending on the amount of material desired.

Figure 5B:
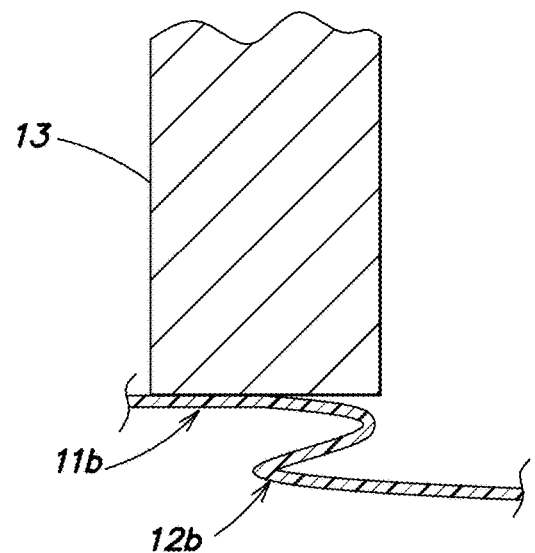

FIG. 5B depicts another embodiment where the substrate material 11b is gathered so as to form an overlapping region 12b, which also provides additional material for forming of the fastening elements. In some embodiments, similar to that with respect to the pleats, a forming device may be used to fold appropriate portions of the substrate over itself, providing the regions of added material.

Figure 5C:
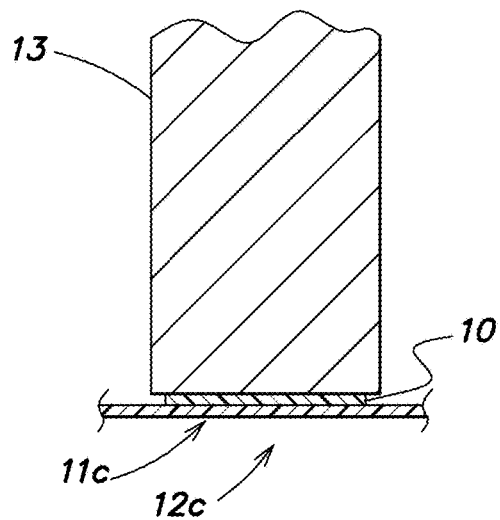

Or, for certain embodiments such as that shown in FIG. 5C, a supplemental material 10 such as a film, nonwoven and/or other material may be added to the substrate material 11c. That is, an additional product and/or layering may be suitably placed on the substrate material 11c at a location 12c for subsequent processing. Accordingly, the fastening elements may be formed when the portion of the substrate material 11c on which the supplemental material 10 is added is placed in appropriate contact with the vibrating source 13.

Figure 5D:
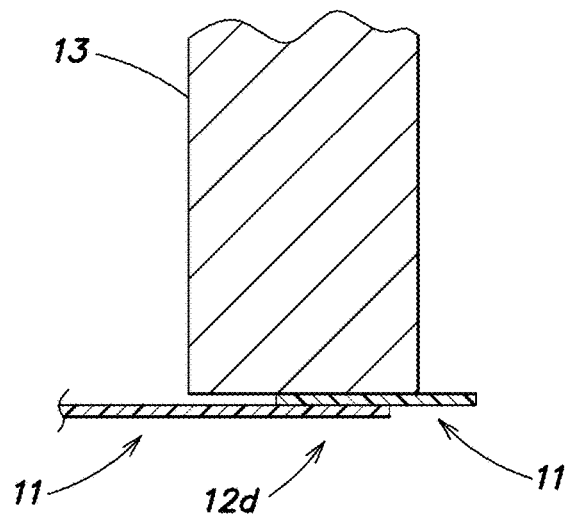

In one embodiment, the substrate 11 may be slit during the formation process before the material enters the nip area of the ultrasonic source. The slit substrate is then overlapped onto each other at the region 12d where the fastener elements are to be formed, as shown in FIG. 5D.

Figure 6A:
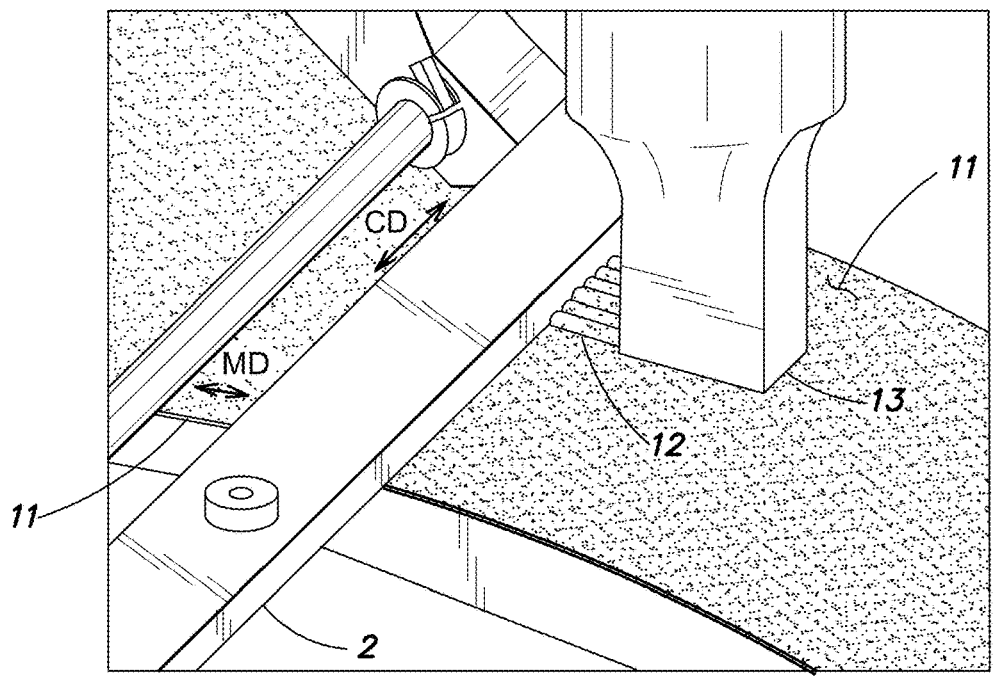
FIGS. 6A-6G show various arrangements for gathering of substrate material in accordance with some embodiments.
Figure 6B:
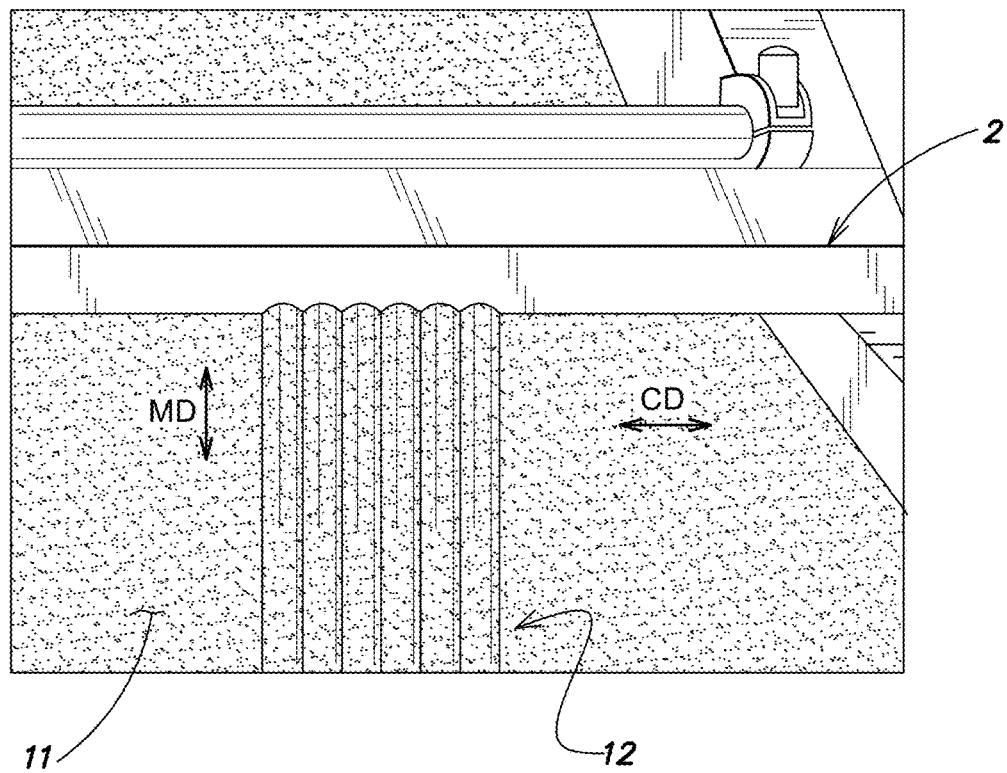

In various embodiments, such as that shown in FIGS. 6A-6E, a forming device 2 may be used to process the substrate 11 so as to gather material together, providing an adequate amount for fastening elements to be fully formed. As shown, in this embodiment, the substrate 11 is fed into the forming device 2, resulting in the formation of pleats 12 extending along the cross-machine direction CD of the substrate. Gathering of the substrate material in the cross-machine direction CD may allow for the substrate material to be easily fed along a line toward a vibrating source 13 for formation of the fastening elements, as shown in FIG. 6A. Though, it can be appreciated that the pleats 12 may also be formed in the machine direction MD, if desired.

The pleated portion 12 of the substrate 11 then moves into contact with the vibrating source 13, for forming the fastening elements. In some embodiments, the vibrating source 13 may itself have a surface that complements the morphology of the gathered substrate material. For example, the vibrating source 13 may have a relatively wavy surface for receiving the pleated or otherwise gathered portion 12 of the substrate 11.

The forming device 2 may gather material in any suitable manner. In some embodiments, as the substrate 11 is fed through the device 2, the substrate material is channeled along a corrugated boss, which forms the pleats thereon. In some cases, the substrate material may be funneled or pushed by other machine components toward and/or against the corrugated boss. In some cases, the substrate material is heated as it is gathered, so as to enhance pliability and/or flowability of the material. It can be appreciated that other methods and components may be used to gather the substrate material together in an appropriate manner, to enhanced manufacturability of the fastening elements. For example, as noted above, the device 2 may fold portions of the substrate 11 over itself to provide an adequate amount of material moving toward ultrasonic formation.

Figure 6C:
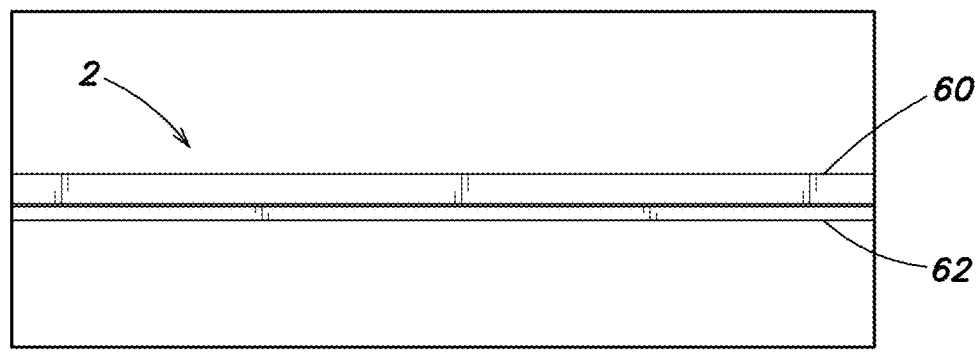
Figure 6D:
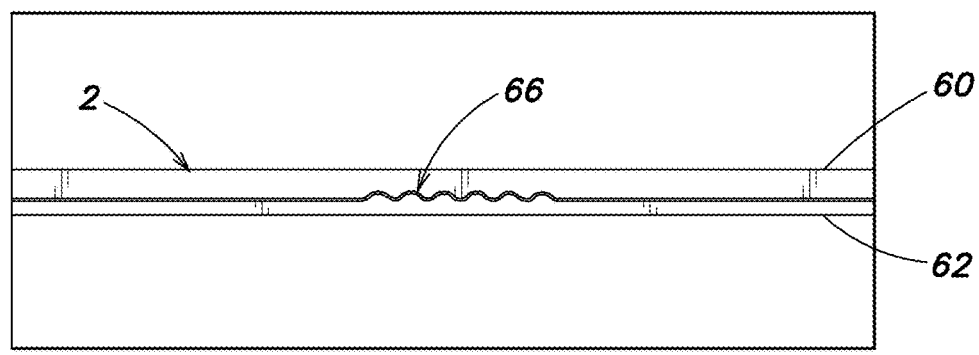
Figure 6E:
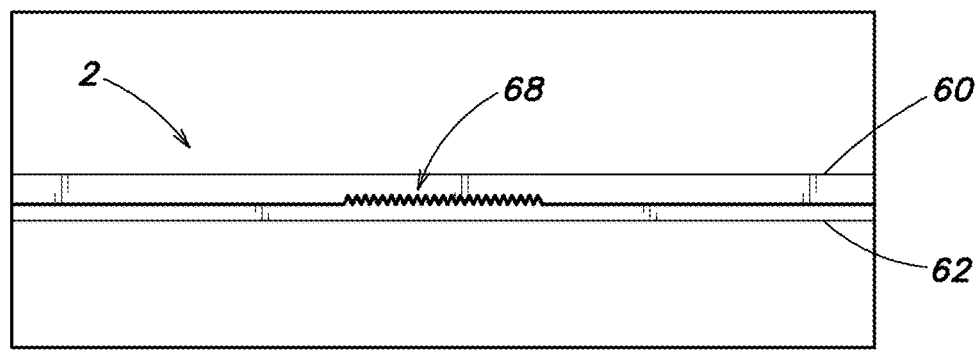

In one embodiment, as shown in FIGS. 6C and 6D, the device 2 includes upper forming bar 60 and lower forming bar 62, each with complementary shaped grooves that cause the substrate material to gather in the pleated fashion as shown. The upper and lower forming bars may be spaced apart a fixed or adjustable distance. As shown in FIG. 62, the leading edge of the device 2 (that is, the material entrance into the device) is relatively flat corresponding to the flat shape of the substrate material. On the exit or trailing edge of the device 2, the upper and lower bars 60, 62 are formed with a corrugated or pleated surface 66 that cause the substrate to gather into pleats. Though not shown, the mating faces of the upper and lower forming bars are formed with a flat funnel shaped entrance that transitions to the pleated section. FIG. 6H shows a schematic representation of the substrate 11 having the gathered or pleated portion 12 after having been subject to a gathering process. The pleats may be tight or loose, as desired. Accordingly, as shown in FIG. 6E, the device 2 may include a more tightly spaced pleated surface 68.

Figure 6F:
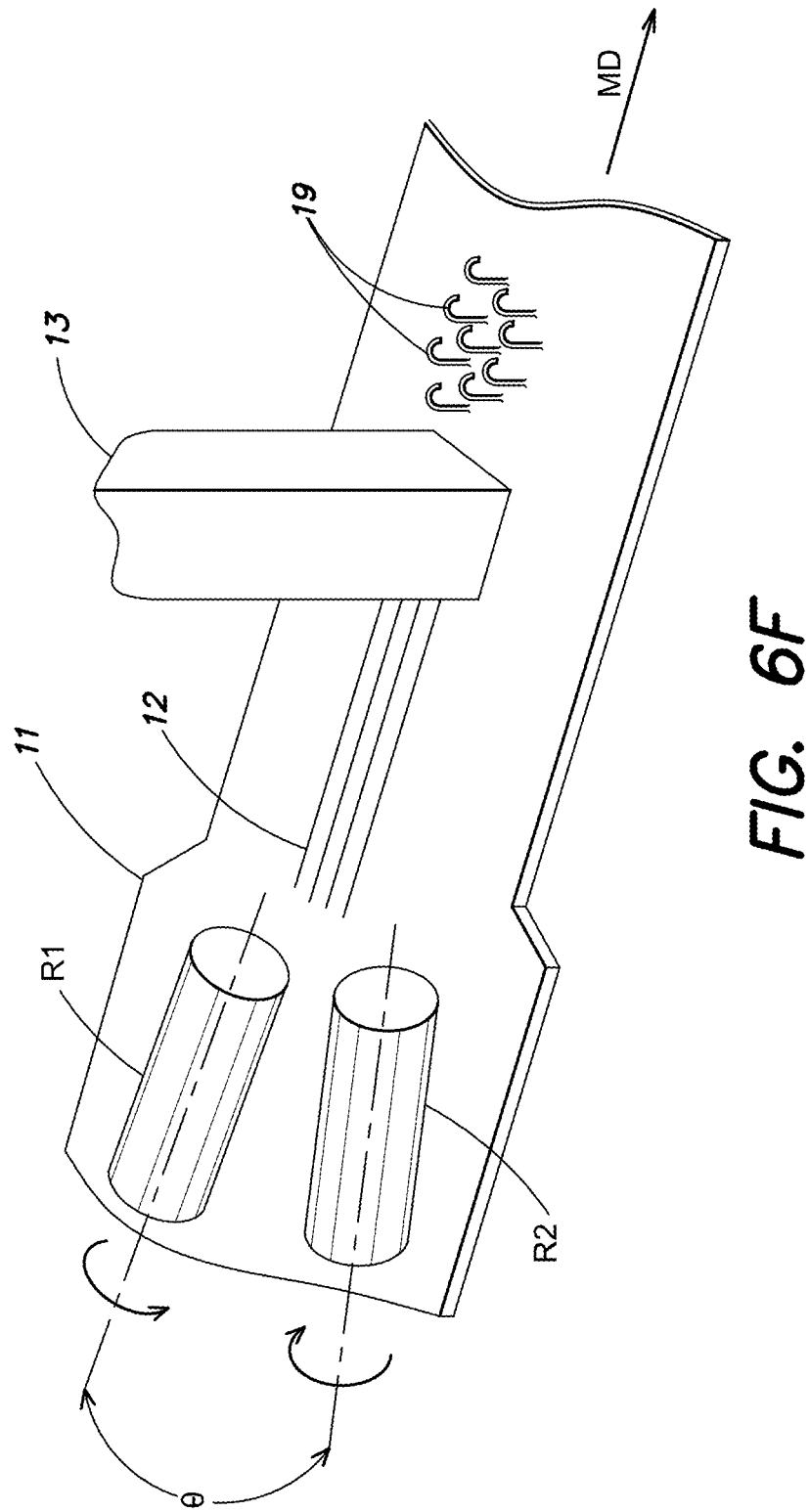
Figure 6G:
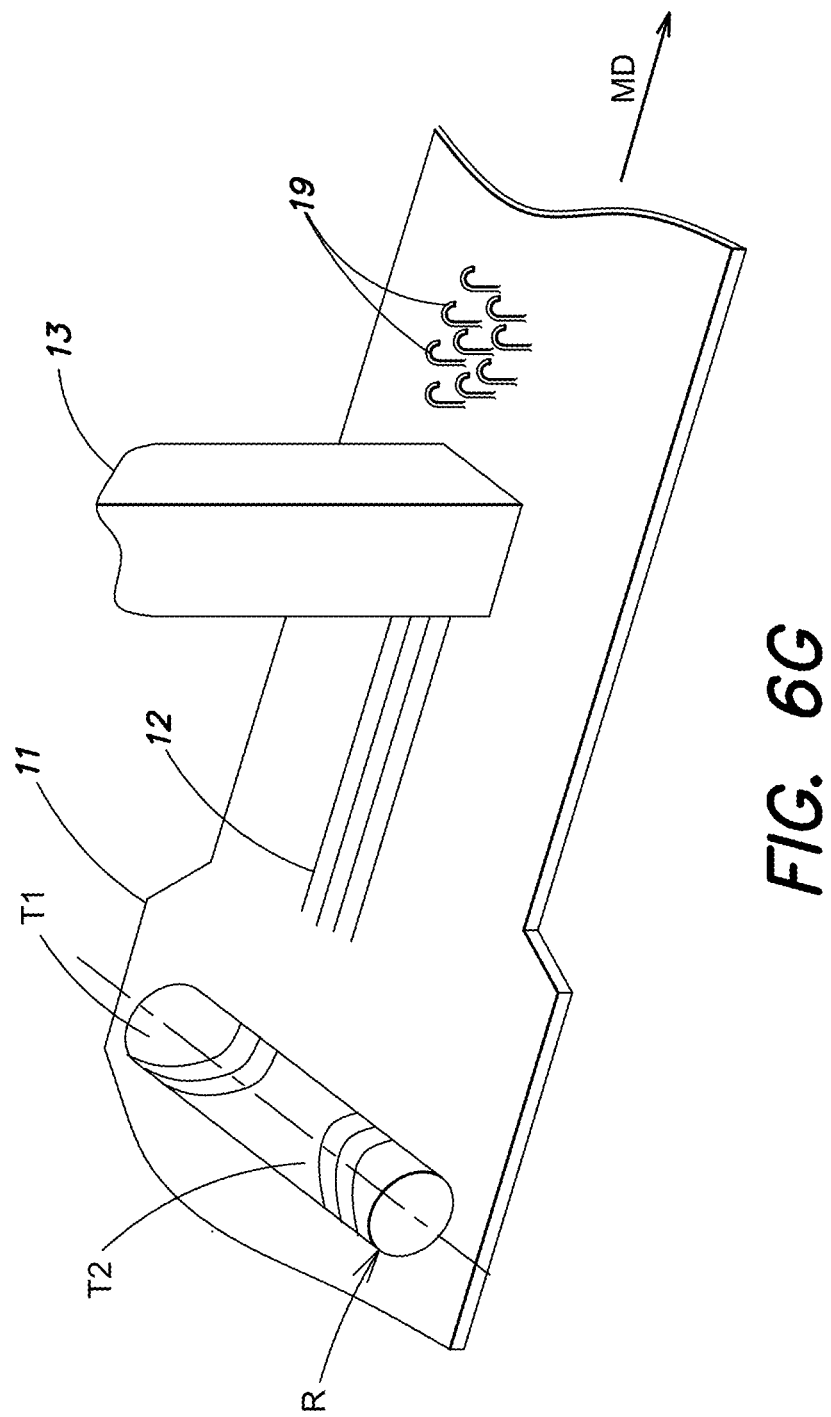

Other arrangements for creating pleats may be employed, as the present disclosure is not limited in this regard. For example, as shown in FIG. 6F, counter rotating rolls R1 and R2 that rotate about an axis that is located along (or at a slight angle Θ such that one or both roll axes is/are offset relative to) the machine direction MD may be used. As the substrate 11 is fed along in the MD, the counter rotating rolls cause the material to gather at the location between the rolls. In one embodiment, the rolls R1 and/or R2 include needles or a roughened surface to aid in gripping and gathering the material. This gathered material 12 is then fed into the nip below the vibrating source 13 for further processing to produce the field of fastening elements 19. Other gathering rolls may be employed as the present disclosure is not limited in this regard. For example, one or more rolls rotating in a direction generally perpendicular to the MD. The roll or rolls includes helically formed ridges, with one roll having a left-handed helix and the other roll having a right-handed helix. These oppositely formed helices are positioned such that the material is urged toward the center to gather the material. Of course, a single roll, such as roll R shown in FIG. 6G may be employed having both the left-handed helix T1 and right-handed helix T2. It should be appreciated that the rolls of FIGS. 6F and 6G are shown schematically and would be coupled to axles and suitable drive arrangements.

In another aspect of the present disclosure, it may be preferable to enhance the efficiency with which ultrasonic energy is applied. Because fastening elements, such as hooks and loops, take up only a discrete amount of space, it may be beneficial to control the amount of ultrasonic energy applied to the forming substrate material. That is, it might not be necessary for vibrational energy to be applied to the entire surface of the forming substrate material. For instance, the application of vibrational energy may be localized such that only areas of the forming substrate material that are required for producing fastening elements may be subject to vibrational energy. Hence, the surface(s) of the mold and/or vibrating source may be tailored such that vibrational energy is only applied to the necessary locations for producing fastening elements.

In some embodiments, the maximum line speed of production using ultrasonics for producing fastening elements may be limited by the available power of existing ultrasonic generators. Hence, production throughput may be improved by tailoring the application of ultrasonic energy, for example, by patterning the molding tool and/or vibrating source such that a suitable level of ultrasonic energy is applied only to the portions of substrate material that require it. For example, the topographical surface of the mold and cavities of the mold are designed for ultrasonic energy to be applied to certain areas in the immediate vicinity of the cavities. That is, there is little to no need to compress, heat and/or ultrasonically treat areas that are not in the immediate vicinity of a cavity unless it is anticipated that the material in those areas will be urged into a cavity.

However, it should be appreciated that the present disclosure is not limited in this regard. For example, in some embodiments, the substrate material not intended to be utilized for the formation of fastening elements may otherwise be processed via the ultrasonic energy so as to form a berm or other reinforcement element or other desirable structure. In such an embodiment, it may be desirable to have some level of compression of the substrate in these regions. In another example, islands or fields of fastening elements may be produced on the substrate, such as on a diaper side tab, with the region around the fastening elements being slightly compressed (or not compressed at all) to create a bald periphery. Further, when a second material is introduced into the nip area and islands of fastening elements are formed, it may be desirable to "stake" or partially bond these two layers in areas where there are no fastening elements. In other words, if two layers of nonwoven material were being formed with intermittent patches of hooks elements, those portions of the resultant substrate between these patches would include two layers of nonwoven material that are not otherwise bonded together in any way. It may be desirable to bond these two layers together sufficiently to make them appear as one layer without stiffening the bonded region.

Figure 7A:
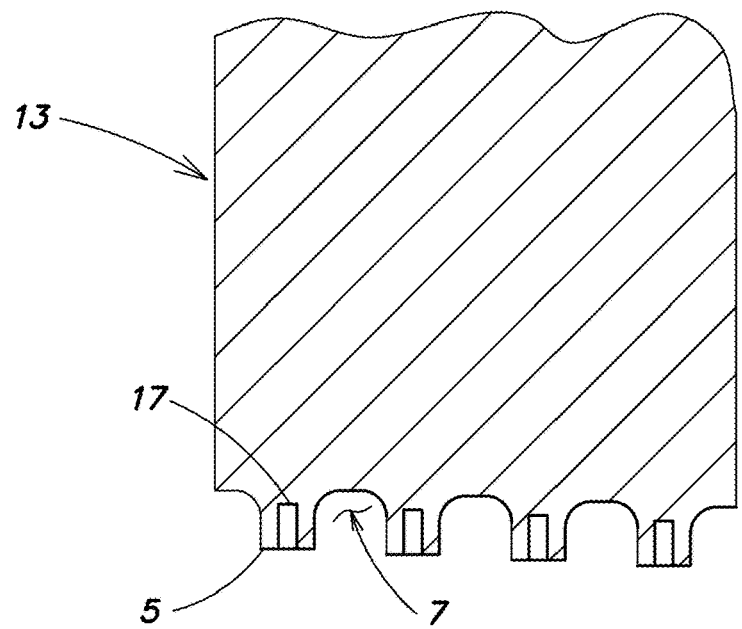
FIGS. 7A-7B depict components for forming fastening elements in accordance with some embodiments.
Figure 7B:
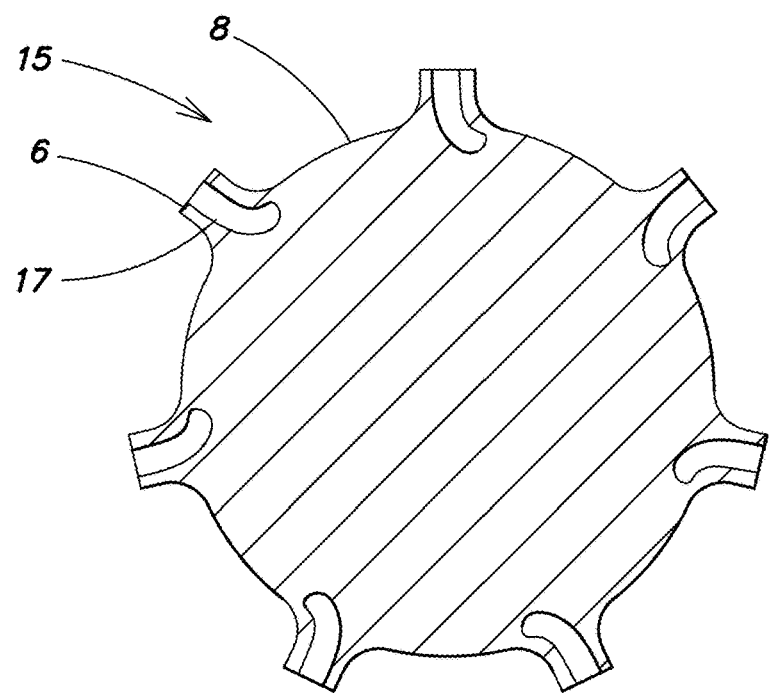

FIGS. 7A-7B show illustrative embodiments where the vibrating source 13 or the mold 15 is designed so as to include contact regions for compressing the substrate material toward the ultrasonic energy during forming of the fastening elements, and recesses which are not intended to come into contact with the substrate material. It should be appreciated that the recesses may be sized so as not to contact the substrate at all or may contact the substrate so as to compress the substrate to a lesser extent than the material that will be urged into the fastener cavities or other feature forming cavity (e.g., berm or reinforcement cavity). The contact regions include cavities into which the softened substrate material flows when exposed to vibration energy, heat and/or other forming conditions.

For the example shown in FIG. 7A, the vibrating source 13 has contact regions 5 for operating on and applying ultrasonic energy to the forming substrate material, and recesses 7 separating the contact regions 5. The contact regions 5 have cavities 17 within which material is formed into fastening elements (e.g., hooks). When the substrate material is suitably compressed or otherwise placed between the vibrating source 13 and a plate (not shown in this figure), the portion of the forming substrate material that is pressed against the surface of the contact regions 5 is softened so as to deform and/or flow into the cavities 17, for forming of the appropriate fastening elements. During processing, the recesses 7 pass over areas of the forming substrate material where the fastening elements are not intended to be formed. In this example, the vibrating source 13 may be used as a stamp that, along with a suitable plate, sandwiches the substrate material therebetween. Though, it can be appreciated that a suitable mold may be used along with the vibrating source 13.

In the example of FIG. 7B, similar to that shown in FIG. 4, the mold 15 is provided as a roll on which a sheet of substrate material may move along. Accordingly, substrate material that is compressed between the contact regions 6 of the mold 15 and the vibrating source is caused to deform into the cavities 17, resulting in forming of the fastening elements. Also, the recesses 8 are aligned with those regions of the substrate material where the fastening elements are not intended to be formed. While a vibrating source is not shown in FIG. 7B, it can be appreciated that any suitable vibrating source may be used along with the mold 15. Alternatively, the mold 15 may act as the vibrating source.

In such embodiments, the vibration energy is directed or concentrated toward the portion(s) of the substrate material from which fastening elements are to be formed and the immediate surroundings. As a result, there is little to no waste of vibration energy on other portions of the substrate material which are not intended to be formed as fastening elements.

It can be appreciated that contact regions and recesses of molds and/or vibrating sources may have any suitable characteristics and dimensions. The contact regions may be large enough to press against and cause an adequate amount of substrate material to fill into respective cavities. For instance, if the contact regions are too small, then an insufficient amount of substrate material may be operated upon for filling of the cavities. On the other hand, larger contact regions and smaller recesses might not be necessary for formation of the fastening elements, and could lead to manufacturing inefficiencies where ultrasonic energy is unnecessarily applied to certain portions of the substrate material. Further, the recesses may be structured to further limit the amount of vibration energy imparted to the substrate material within or adjacent the recess.

The contact regions and/or recesses may have any suitable combination of structural features, such as ridges, fillets, rounds, bevels and/or other oriented features that may serve to guide material towards respective cavities, increasing the available amount of material for production. These structural features may also serve to provide support to individual fastening element enhancing their ability to resist loads applied from various directions. For example, the area around the formed fastening element may have been weakened or thinned during the forming process and thus the fastening element itself may not adequately resist the forces applied to it to hold onto the mating fasting element (which may occur due to the shear load placed on the fastening element). By forming structural enhancements such as reinforcement members, berms, ridges, etc., that may serve to link adjacent fastening elements, the fastening elements may better resists the shear loads applied to it. In one embodiment, as shown in FIG. 2B, the berms 50 are formed so as to effectively link the fastening elements 19 side to side and front to back. Contact regions and recesses of the mold and/or vibrating source may also be arranged according to any suitable pattern. For instance, contact regions and recesses may be arranged for the formation of a small number of fastening elements (e.g., single cavity, few cavities within a contact region) and/or for larger numbers or patches of fastening elements (e.g., numerous cavities within a contact region). This may include the formation of single hook elements formed along various positions on the substrate material. These single hook elements may be formed as individual elements or may be formed as a patch of elements separated from one another, or may be alternatively formed on an entire surface of a substrate. As an example, for the formation of relatively large patches of hooks, a mold and/or vibrating source may have contact regions separated by recesses where each of the contact regions may have several cavities.

As also described herein, supplemental materials may be provided to the substrate material and/or cavities before, during and/or after fastening elements are formed. In some embodiments, such supplemental material(s) may serve as an adhesive, binder and/or stiffening agent, for producing mechanically strong, durable, flexible and/or resilient fastening elements. In some embodiments, additional material(s) (e.g., corn starch, talc, barium (which may aid is x-ray imaging if the end-product is used in medical applications), gypsum, ceramic, biodegradable, anti-microbial, ferrous or non-ferrous materials, magnetically attractive materials, RF excitable material (which allows the substrate to be heated using RF energy)) may be introduced before, during and/or after formation of the fastening elements. Such materials may be in powdered or sheet/film form. The additional material(s) may be applied to a surface (e.g., laminated, coated, dusted, etc.) and/or impregnated (e.g., saturated, mixed, etc.) with the substrate material, for beneficially altering certain characteristics of the fastening elements. In some embodiments, the additional material(s) may be provided to the substrate material according to a pattern where a fraction of the fastening elements on a product exhibit certain qualities (e.g., stiffer, harder, more resilient, etc.) and other fastening elements on the product exhibit other qualities (e.g., softer, more flexible, etc.). For example, as shown in FIGS. 8A-8B, additional materials may be laminated and/or embedded with the substrate material.

Figure 8A:
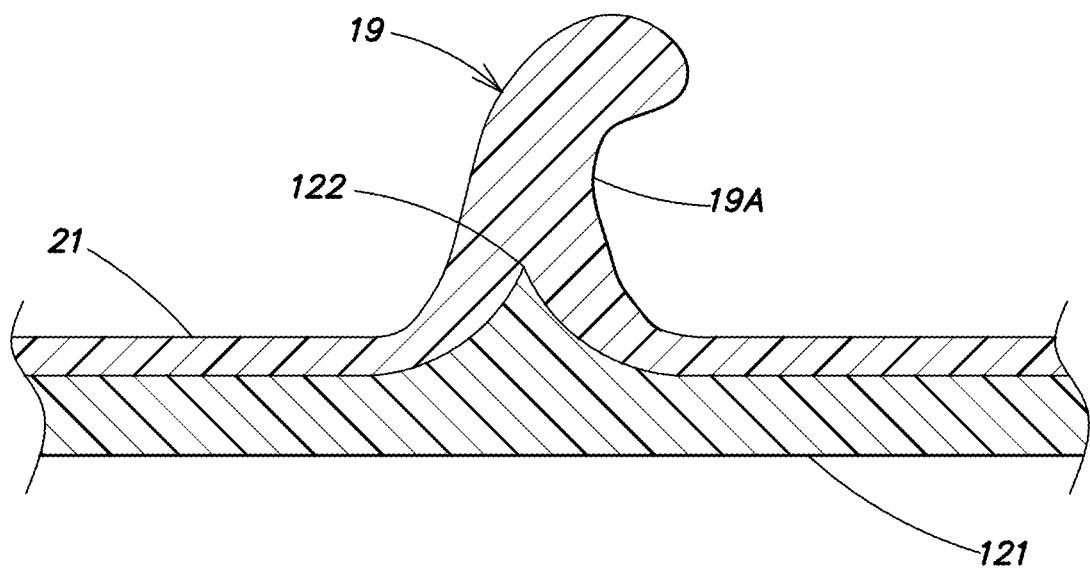
FIGS. 8A-8B show cross-sectional views of fastening elements and substrates in accordance with some embodiments.
Figure 8B:
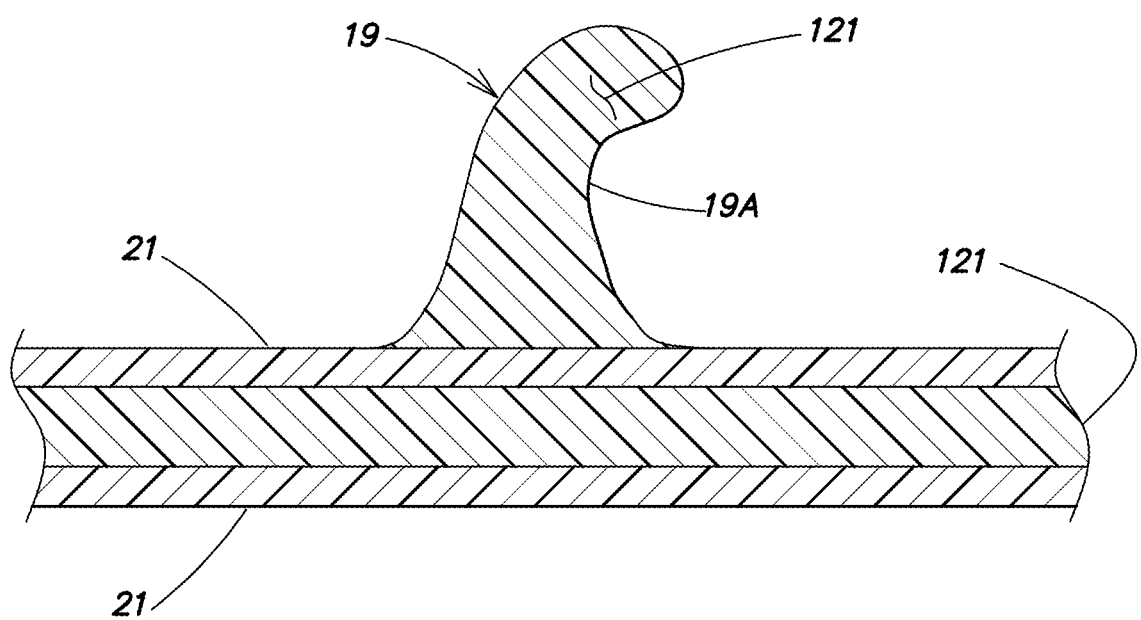

FIGS. 8A-8B show illustrative embodiments of multilayered arrangements where one or more layers are laminated and/or embedded with the substrate material 21, for forming a projection 19, or fastening element (e.g., hook, stem, etc.). In FIG. 8A, the second material 121 has been joined or otherwise positioned adjacent to the substrate material 21 and through processing according to the present disclosure, the projection 19 is formed. As the projection 19 is formed, a portion 122 of the second material 121 may extend into the body or stem 19A of the projection 19, which may provide enhanced properties to the projection. For example, portion 122, which may be formed from substrate material 121 may have a different Shore Hardness value than the Shore Hardness value that is associated with substrate material 21.

In some embodiments, the substrate 21 includes an elastomeric material, a portion of which is formed into the projection 19 or fastening element. As shown in FIG. 8A, a portion 122 of the second material 121 protrudes into the body 19a of the projection 19. In some embodiments, the viscosity, melting and/or glass transition temperature of the second material 121 may be similar to that of the substrate material 21, for example, to allow for a strong attachment or adherence between the substrate material 21 and second material 121. In various embodiments, it may be preferable for at least a portion of the second material 121 to be drawn up into the body 19a of the projection 19. In some cases, the second material 121 may include fibers, stiffeners, additives and/or other materials, which may exhibit characteristics that may be desirably incorporated into the projection 19. In some embodiments, both the substrate 21 and the second material 121 may include an elastomeric material.

FIG. 8B shows another embodiment of a multilayered laminate arrangement. In this example, a second material 121 is embedded within the substrate 21. This embedded material 121 may be selected according to any suitable desired characteristics and, for example, may include non-woven materials, woven materials, open foam materials, polymers, elastomers, other materials, or combinations thereof. In contrast with the example of FIG. 8A, the material 121 forms the projection 19 or fastening element. The substrate material 21 may be a fibrous non-woven material and the second material 121 may be an elastomeric film embedded within the non-woven material 21. The elastomeric film may provide an added degree of stretch and elasticity to the product and, as noted above, may be used as material in forming the protrusions 19.

The elastomeric film may be embedded within the non-woven material by any suitable method. In some cases, the elastomeric film may be introduced during the vibrational forming process. The elastomeric film may have melt and glass transition properties that differ from the non-woven material and, hence, may be softened and forced through fibrous pores of the non-woven component and into the hook cavities, resulting in the formation of elastomeric hooks on the surface of the substrate, with a non-woven material left predominately in the plane of the substrate surrounding the elastomeric projections 19. Accordingly, as shown in FIG. 8B, the second material 121 (e.g., elastomeric material) may form the projection 19 (e.g., hook) rather than the substrate material 21 (e.g., fibrous non-woven material). Though, it can be appreciated that in such an embodiment, the substrate material 21 and the second material 121 may include any suitable composition. For example, the substrate material 21 may include an elastomeric material and/or the second material 121 may include a non-woven material.

In some embodiments, the second material 121 may be a polymer film having a lower melt temperature than the non-woven material of the substrate 21. Similar to that with respect to the elastomeric material, the polymer film may be introduced between the vibration source and nonwoven substrate and heated so as to be softened, and then forced through the fibrous pores of the non-woven material and into the hook cavities, for forming the projections 19. Hence, the non-woven material may be left predominately in the plane of the substrate surrounding the polymeric projections 19. Accordingly, when producing a fastening product from multilayered laminate substrates, aspects according to the present disclosure make it possible to selectively form fastening elements (e.g., hooks) from one or more of the layered materials, for example, based on melt properties of a particular material.

In one experiment conducted by the inventor, the inventor introduced aluminum foil between a polymer film and the mold roll during application of ultrasonic energy. The polymer film burst through the foil at each cavity and allowed the polymer to fill the cavities. This produced a touch fastener strip that was mostly comprised of polymer but had a surface layer of aluminum on the hook side surface. The foil exhibited a slight flaring into the cavities as the foil was apparently stretched prior to or immediately after bursting. The foil layer could add reflectivity to the touch fastener strip. Other metal foils or retro-reflective foils may be used.

A layer of paper or other cellulosic material may be substituted for the foil if desired. This may allow for the production of a touch fastener strip with a decorative or functional top layer. The layer could be a preprinted paper containing images or logos or instructions, etc. This layer may be introduced with a single layer of polymer or may be introduced with other materials as well. For example, a layer of non-woven material, a polymer film and a layer of preprinted paper may be introduced between the mold roll and vibration source with the paper positioned on the mold roll side. Hook elements may then be formed after bursting through the paper and the polymer film would be simultaneously attached to the nonwoven material. This would allow logos or images to be created on the hook surface of a diaper tab. Cartoon characters or other designs may be utilized.

It should be appreciated that the overlying layer may not be burst through and instead the underlying material may simply extend through the overlying layer. In one embodiment, this may occur when the overlying layer is formed as a porous layer such that the underlying material may simply extend through the pores of the overlying layer. Porous layers may be formed by forming holes in the layer or simply from a fibrous nature of the material.

It may be also desirable to print onto the substrate utilizing the mold roll. For example, prior to forming the fastening elements, the ink applied to or through the mold roll would then transfer to the face of the hook side of the substrate.

In one embodiment, fastener elements may be formed on human or animal tissue insitu by employing controlled vibration energy. The fastening elements would be mated with adjacent tissue via penetration into the adjacent tissue. The mated structure would act as a temporary closure (e.g., wound closure) and ultimately be absorbed into the body. In addition, or alternatively, a wound closure device may be formed by forming fastening elements on a collagen or other bio-absorbable material by employing vibration energy, which could be mated with adjacent tissue.

As described herein, fastening products may employ a suitable multilayered laminate arrangement. For some embodiments, it may be desirable to control the ability of a material to stretch. For instance, substantially extensible or non-extensible materials may be laminated to or otherwise incorporated with the substrate and/or materials (e.g., elastomeric, polymeric materials) of the fastening product before, during and/or after formation of the fastener elements. When a substantially non-extensible or relatively stiff material is laminated to or embedded within a substrate incorporating an elastomeric material, the overall fastening product may be more limited in extensibility. It can be appreciated that the additional stiff material may extend over a portion or the entirety of the surface of the fastening sheet. The additional stiff material may include any suitable form, for example, such a material may be a sheet, film, wire, strips, etc. In some cases, it may be preferable to limit the extent to which the fastening product is able to stretch, for example, so that the product does not abruptly snap back into position, reduce the likelihood for the product to be damaged, etc.

As discussed above, the amount of stretching of the substrate may be limited, for example, via a tether, non-extensible strip, and/or other material that exhibits a relatively high stiffness when the substrate is subject to a certain level of extension. Such a tether and/or strip may be incorporated into the substrate via any suitable method, for example, during formation of the fastener elements, lamination and/or another appropriate method.

Figure 9A:
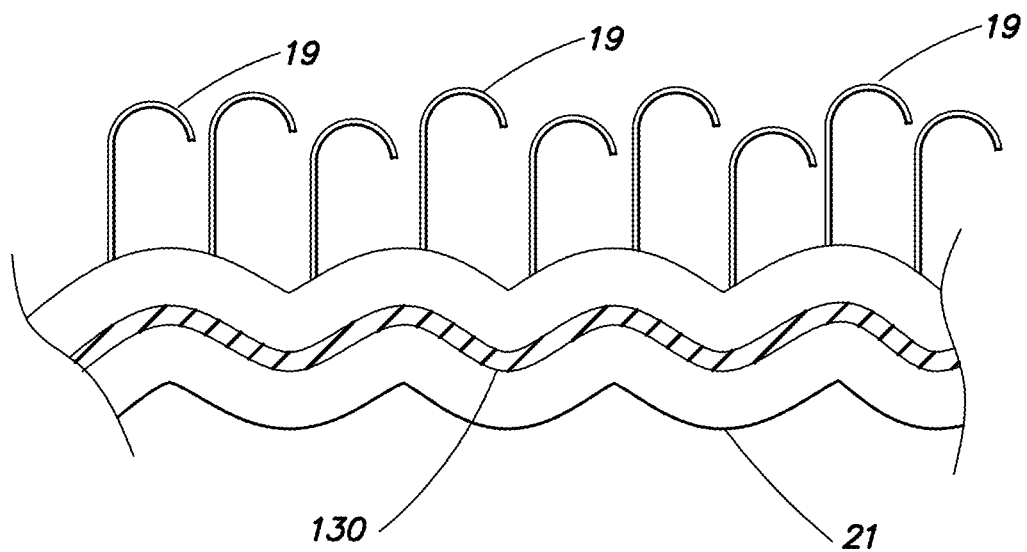
FIGS. 9A-9B illustrate extension and retraction of fastening elements and a substrate in accordance with some embodiments.
Figure 9B:
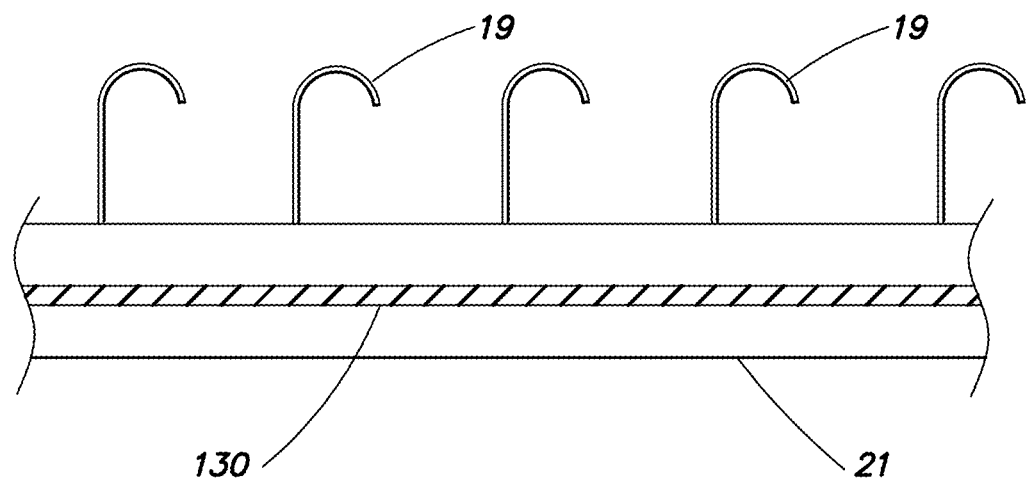

FIGS. 9A-9B depict an example of a substrate having a stiff, generally non-extensible material laminated with more stretchable material. In this embodiment, the fastening elements 19 extend from the substrate 21, which is formed of a stretchable elastomer. An additional layer 130, formed of a non-extensible material (e.g., polymer, thermoplastic, non-extensible rubber, etc.), is laminated to the substrate 21 (such lamination occurring prior to or during the formation process). FIG. 9A shows the fastening product in a retracted position where it can be stretched, folded and/or bent in any suitable direction. FIG. 9B shows the product in an extended position where the components are stretched out. Here, when the stretched product extends to a certain point, the additional layer 130 provides resistance to further stretching. Accordingly, the additional layer 130 may suitably prevent excessive stretching of the product.

Figure 10A:
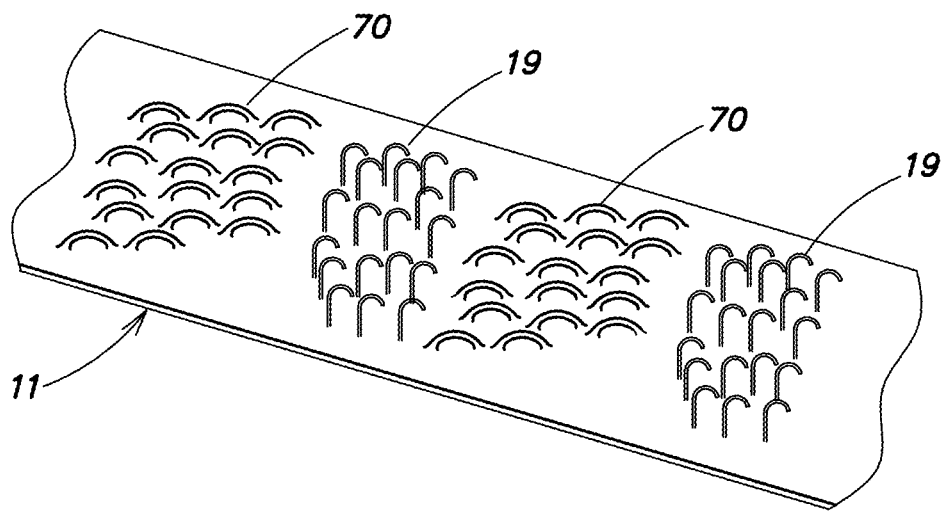
FIGS. 10A-10B illustrate a touch fastener strip in accordance with some embodiments.
Figure 10B:
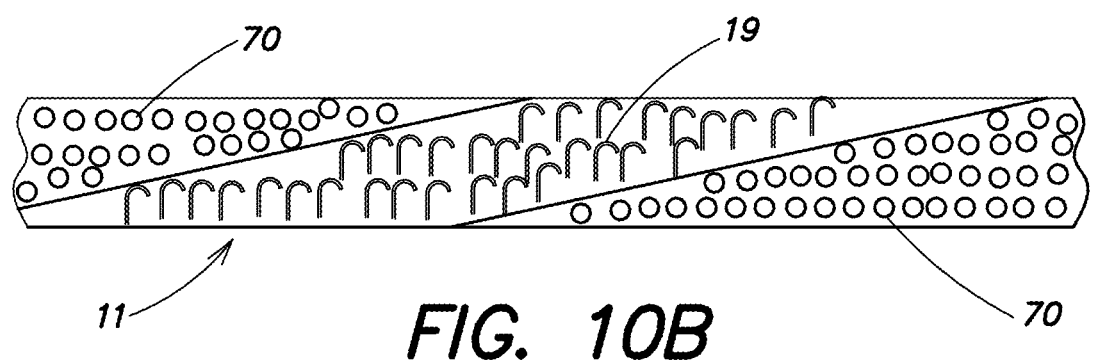

It is also possible to modify or enhance the performance of an existing loop or loop-like structure using ultrasonic energy applied to the substrate either while forming the fastener elements or before or afterward. For example, when applied to a non-woven substrate that may be marginal as a mating fastener (e.g., loop) material, a honeycomb surface pattern on the mold roll, located in regions of the mold roll where there are no fastener element (e.g.) hook cavities, could serve to selectively compress and bond a non-woven substrate in such a fashion so as to create dots or patches of mating fastener that are more functional (e.g., by compressing the perimeter, a raised pillow of substrate material is formed, with such material being more readily snared by hooks than a flat surface of the substrate. A rib pattern may be utilized in lieu of a dot pattern. Indeed, other patterns may be employed, as the present disclosure is not limited in this respect. In one embodiment, the raised feature is formed at the same time that the fastener elements are formed. FIGS. 10A and 10B show examples of such a touch fastener strip. The use of ultrasonic energy on the substrate can enable forming not only the fastener elements, but also enhance the complementary mating surface of the substrate. For example, the substrate 11 may be modified with vibration energy to produce depressed regions on the substrate resulting in raised embossments 70. That is, depressions are formed on the loop substrate so as to form spaced apart fields of loop structures, which may result in a honeycomb or honeycomb-like pattern or linear pattern of spaced apart fields of loop structures. As noted above, portions of the substrate may be gathered to increase the density of the substrate available for forming the embossments. The plurality of embossments 70 allow for the substrate material to stand proud of the substrate 11 such that the raised dimples 70 can more readily engage the hooks 19. In this regard, the multiple raised dimples provide multiple leading and trailing edges of the complementary mating material. This may be especially useful when the substrate is a non-woven material. In embodiments, as shown, where fields of fastener elements are formed adjacent fields of embossments, the touch fastener strip can be attached to itself when used as a wire or cable tie. Of course, the features (fasteners and mating features) can be formed on opposite sides of the substrate such that when the strip is coupled to itself around a cable or wire bundle, the fasteners can readily engage the mating features. As shown in FIG. 10B, which is a top plan view of the touch fastener strip, the touch fastener strip may be formed such that adjacent fields are formed in an angular pattern. In this way, one end of the strip can engage the oppose end of the strip regardless of where the two come into contact with each other. Though the above is described with respect to a fastener strip, these concepts may be embodied on a diaper or portions of a diaper. It should be appreciated that the features described above can be formed in any suitable pattern, such as in a grid pattern or a honeycomb pattern.

Figure 11A:
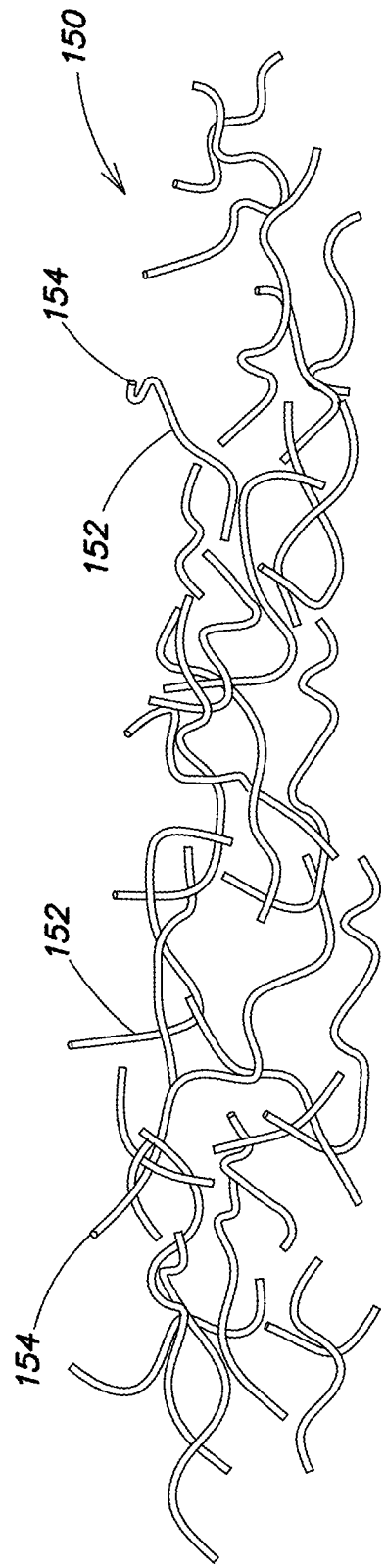
FIGS. 11A-11B, and 11C illustrate a touch fastener strip in accordance with other embodiments.
Figure 11B:
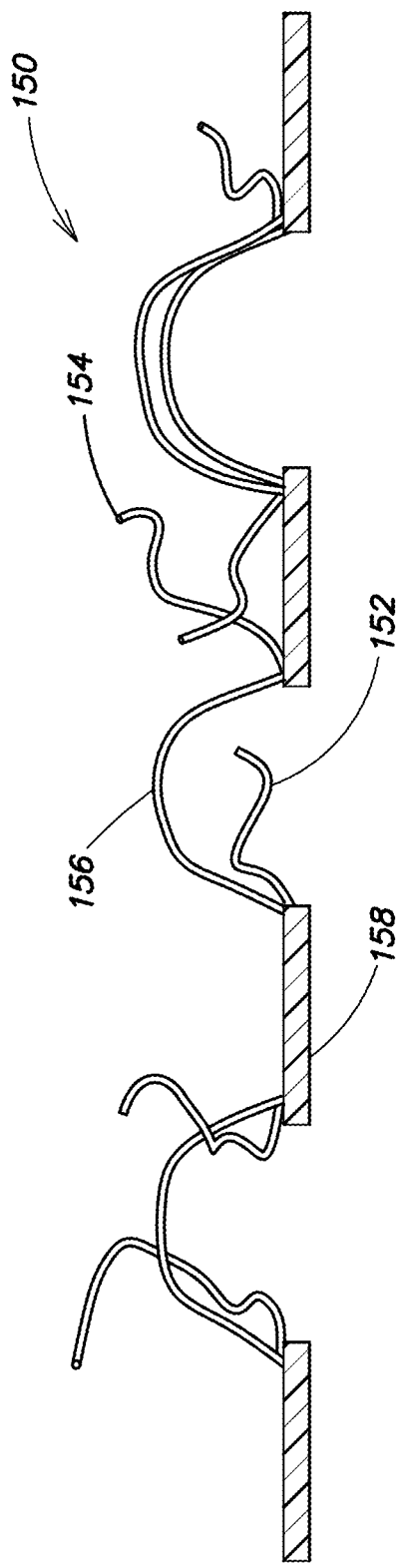

In one embodiment, as shown in FIGS. 11A and 11B, a non-woven substrate material having random fibers can be embossed such that at least some of the ends of the fibers are "welded" (i.e., "staked") down by the embossment to create adjacent lofted areas that can serve as loops with which to engage fastener elements. As shown in FIG. 11A, a substrate 150 formed from a non-woven material (or having a non-woven layer) includes a plurality of fibers 152. The fibers are randomly oriented fibers intertwined and held relative to each other through friction. In some cases, the fibers may be loosely bonded together, as is known in the art of non-woven material formation. As illustrated, the fibers 152 have ends 154 with some of the ends 154 extending upward from the substrate whereas other fibers 152 are more embedded within the layer of the substrate itself. In either case, it may be difficult if not impossible for the mating fastener element (e.g., hook element) to engage with the fiber let alone hold to it to form a suitable touch fastener arrangement. That is, it may be difficult for a mating fastener element to reach down into the layers of fibers in order to grasp the fibers. Thus, in order to render the non-woven substrate more suitable for engagement with a mating fastener element, in one embodiment as illustrated in FIG. 11B, the substrate 150 is embossed using the aforementioned ultrasonic forming technology. This embossing process effectively renders the substrate to be more three-dimensional rather than having a relatively flat upper surface, as shown in FIG. 11A. That is, the embossment causes some of the fibers 152 to be raised proud of the substrate, enabling a mating fastener element to more readily engage the substrate material, as explained above by creating more leading and trailing edges of the field of engagement. In this regard, the embossment causes regions of the non-woven material adjacent the welded regions to become lofted. It should be appreciated that the embossment may be in any desired pattern, such as a checkerboard, a honeycomb pattern, a series of strips, a series of rounded pillows or any other shape that creates a patchwork of raised and staked land portions.

In addition, the embossing process may cause at least some portions of the fibers (such as the two ends 154 of the fibers 152 or an end and a mid-section of the fibers or two spaced apart mid-sections of the fibers) to become staked (i.e., bonded) within welded regions 158 creating one or more raised loop structures 156. In some cases, the staking operation will tend to bond the fibers to a greater extent than found initially in the virgin state of the non-woven such that the resulting loop structures 156 are then capable of readily being engaged by the mating fastener elements and providing a more suitable holding force for the mating fastener without the fibers becoming decoupled from the substrate. In other words, the bond is a greater bond that in the virgin material. This bonding can also serve to enhance the structure integrity to the substrate by creating reinforced sections on the substrate, as explained above.

Figure 11C:
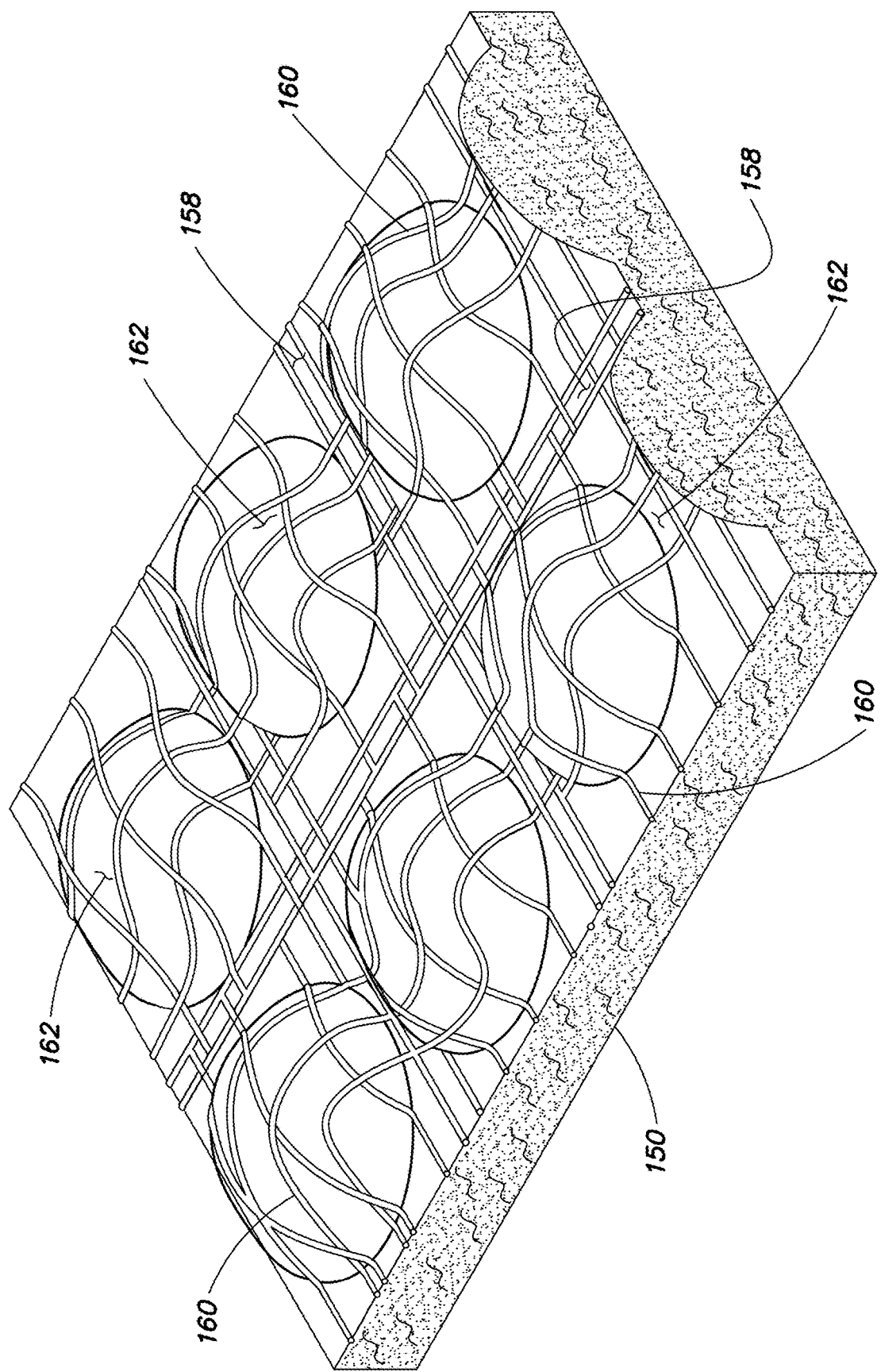

In one embodiment, as shown in FIG. 11C, the non-woven substrate 150 may be laminated to another material 160 that is formed with openings 162, such as a screen-like material. During the embossing process, the laminate of non-woven material 150 and laminating material 160 is staked as described above such that regions of the non-woven and the laminating material becomes lofted relative to the pinched areas 158. This creates a three-dimensional region with which to more readily receive the mating fastener element. That is the fastener element can more readily grasp the laminate material by entering the openings of the laminate, pushing the underlying non-woven material out of the way and then hooking/grasping on to portions of the laminate. In one embodiment, the underlying non-woven material aids in biasing the hook upward into engagement with the portions of the laminate.

It should be appreciated that the fastener elements may be formed directly on an end-product or on a component of an end product. For example, the fastener elements may be formed directly on a diaper or on a diaper tab (which is then subsequently attached to the diaper or is an extension of the diaper side panel, etc. as explained above), as the present disclosure is not limited in this regard. Further, the complementary mating features may be formed on the diaper itself as well, creating a landing field for the fastener elements.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only. It should be appreciated that the various features of the embodiments discussed herein may be arranged in any suitable combination, as the present disclosure is not limited in this respect.

The invention claimed is:

1. A diaper tab comprising:
a non-woven substrate material including touch fasteners formed thereon, the touch fasteners formed by the method of:
positioning the non-woven substrate material having loops formed thereon adjacent a vibration source;
forcing a portion of the non-woven substrate material into touch fastener mold cavities upon vibration from the vibration source to produce a plurality of the touch fasteners formed from the non-woven substrate material itself; and
forming a plurality of spaced-apart touch fastener fields having a plurality of leading and trailing edges formed on a surface of the non-woven substrate material, wherein spaced-apart loop fields of the non-woven substrate material remains between the plurality of spaced-apart touch fastener fields,
wherein the loops of the non-woven substrate material are formed integrally from the substrate material itself, and wherein the touch fasteners formed from the non-woven substrate material are configured to mate with the loops.

2. The diaper tab of claim 1, wherein the plurality of spaced-apart touch fastener fields are spaced inward from a peripheral edge of the non-woven substrate material.

3. The diaper tab of claim 1, wherein a pattern of the plurality of spaced-apart touch fastener fields is formed intermittently along a surface of the non-woven substrate material.

4. The diaper tab of claim 3, wherein the pattern comprises at least one of lines, stripes, circles, arcs, ellipses, ovals, squares, rectangles, angled lines, patches, and logos.

5. The diaper tab of claim 1, wherein the touch fasteners located in the plurality of spaced-apart touch fastener fields include two or more types of touch fasteners.

\* \* \* \* \*